(12) United States Patent
Choi et al.

(10) Patent No.: US 10,943,260 B2
(45) Date of Patent: Mar. 9, 2021

(54) METHOD AND DEVICE FOR PROVIDING RECOMMENDATION PANEL, AND METHOD AND SERVER FOR PROVIDING RECOMMENDATION ITEM

(71) Applicant: SAMSUNG ELECTRONICS CO., LTD., Suwon-si (KR)

(72) Inventors: Won-young Choi, Seoul (KR); Nam-wook Kang, Seoul (KR); Jong-hyun Ryu, Daejeon (KR); Hee-chul Jeon, Suwon-si (KR); Sang-ok Cha, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 118 days.

(21) Appl. No.: 14/176,381

(22) Filed: Feb. 10, 2014

(65) Prior Publication Data

US 2015/0066643 A1   Mar. 5, 2015

(30) Foreign Application Priority Data

Feb. 8, 2013   (KR) .................. 10-2013-0014653
Aug. 28, 2013  (KR) .................. 10-2013-0102663

(51) Int. Cl.
*G06Q 30/02*   (2012.01)
*G06F 3/0488*  (2013.01)
*G06Q 50/00*   (2012.01)

(52) U.S. Cl.
CPC ....... *G06Q 30/0255* (2013.01); *G06F 3/0488* (2013.01); *G06Q 50/01* (2013.01)

(58) Field of Classification Search
CPC combination set(s) only.
See application file for complete search history.

(56) References Cited

U.S. PATENT DOCUMENTS 8,250,012 B1   8/2012 Whitman et al.
8,745,047 B2   6/2014 Fein et al.
(Continued)

FOREIGN PATENT DOCUMENTS

CN   101556615 A   10/2009
CN   101959179 A   1/2011
(Continued)

OTHER PUBLICATIONS

Zhang, Ning, Large-Scale Content-Based Analysis and Applications Using Bag-Of-Words Model, 2012,1-137. (Year: 2012).*

(Continued)

*Primary Examiner* — Marie P Brady
(74) *Attorney, Agent, or Firm* — Sughrue Mion, PLLC

(57) ABSTRACT

A method and device which provide a recommendation to a user based on the type of device are provided. The device includes: a user input which is configured to receive a user touch input, a communicator which is configured to transmit a recommendation item request including identification information of the device to a server in response to the user touch input and receive at least one recommendation item selected based on the identification information of the device from the server; a display which is configured to display a recommendation panel including the received at least one recommendation item; and a controller which is configured to control the communicator to receive the at least one recommendation item and control the display to display the recommendation panel.

39 Claims, 23 Drawing Sheets

(56) References Cited

U.S. PATENT DOCUMENTS

| | | | |
|---|---|---|---|
| 9,204,077 B2* | 12/2015 | Kim | G06F 1/1694 |
| 9,646,313 B2* | 5/2017 | Kim | G06Q 30/02 |
| 2001/0044759 A1* | 11/2001 | Kutsumi | G06Q 30/0631 |
| | | | 705/26.7 |
| 2007/0288543 A1 | 12/2007 | Evans et al. | |
| 2009/0133059 A1* | 5/2009 | Gibbs | G06F 16/48 |
| | | | 725/34 |
| 2009/0163183 A1 | 6/2009 | O'Donoghue et al. | |
| 2009/0248575 A1 | 10/2009 | Dipl. Ing. Proidl et al. | |
| 2009/0254548 A1 | 10/2009 | Nagano et al. | |
| 2009/0319166 A1* | 12/2009 | Khosravy | G06O 30/0229 |
| | | | 701/532 |
| 2009/0319462 A1 | 12/2009 | Tirpak et al. | |
| 2010/0057778 A1 | 3/2010 | Fein et al. | |
| 2010/0169154 A1* | 7/2010 | Kraft | G06Q 30/0601 |
| | | | 705/7.29 |
| 2010/0198944 A1* | 8/2010 | Ho | H04L 12/189 |
| | | | 709/217 |
| 2010/0241699 A1 | 9/2010 | Muthukumarasamy et al. | |
| 2010/0316349 A1 | 12/2010 | Nagano | |
| 2011/0093415 A1 | 4/2011 | Rhee et al. | |
| 2011/0209098 A1* | 8/2011 | Hinckley | G06F 3/04883 |
| | | | 715/863 |
| 2011/0264736 A1 | 10/2011 | Zuckerberg et al. | |
| 2011/0276401 A1* | 11/2011 | Knowles | H04L 51/20 |
| | | | 705/14.58 |
| 2011/0314084 A1* | 12/2011 | Saretto | H04W 4/185 |
| | | | 709/203 |
| 2012/0135684 A1 | 5/2012 | Shrum, Jr. et al. | |
| 2012/0143791 A1* | 6/2012 | Sathish | H04L 67/22 |
| | | | 706/12 |
| 2012/0191844 A1* | 7/2012 | Boyns | G06O 30/0282 |
| | | | 709/224 |
| 2012/0197857 A1* | 8/2012 | Huang | G06F 3/017 |
| | | | 707/706 |
| 2012/0288190 A1* | 11/2012 | Tang | G06F 40/103 |
| | | | 382/165 |
| 2012/0290434 A1* | 11/2012 | Moritz | G06Q 30/0261 |
| | | | 705/26.7 |
| 2013/0036382 A1* | 2/2013 | Yuan | G06F 3/04883 |
| | | | 715/815 |
| 2013/0073485 A1* | 3/2013 | Sathish | G06N 20/00 |
| | | | 706/12 |
| 2013/0232015 A1* | 9/2013 | Watanabe | G06Q 30/0251 |
| | | | 705/14.73 |
| 2014/0067929 A1* | 3/2014 | Kirigin | H04L 67/06 |
| | | | 709/204 |
| 2014/0074649 A1* | 3/2014 | Patel | G06O 30/0631 |
| | | | 705/26.7 |
| 2015/0169166 A1* | 6/2015 | Kim | G06T 3/40 |
| | | | 715/838 |
| 2015/0170041 A1 | 6/2015 | Shishido et al. | |
| 2018/0032997 A1* | 2/2018 | Gordon | G06Q 30/0269 |

FOREIGN PATENT DOCUMENTS

| | | | |
|---|---|---|---|
| CN | 102439582 A | | 5/2012 |
| CN | 102880501 A | | 1/2013 |
| GB | 2479947 A | | 11/2011 |
| JP | 06251115 A | | 9/1994 |
| JP | 2002-203168 A | | 7/2002 |
| JP | 2007208340 A | | 8/2007 |
| JP | 2009-252010 A | | 10/2009 |
| JP | 201055590 A | | 3/2010 |
| JP | 2010-191802 A | | 9/2010 |
| JP | 2011-003224 A | | 1/2011 |
| JP | 2013003763 A | | 1/2013 |
| KR | 10-2009-0069978 A | | 7/2009 |
| KR | 10-2013-0010584 A | | 1/2013 |
| KR | 20180133531 A | * | 12/2018 |
| RU | 2451986 C2 | | 5/2012 |
| WO | 2010/134173 A1 | | 11/2010 |
| WO | 2011136128 A1 | | 11/2011 |

OTHER PUBLICATIONS

Communication dated May 12, 2014, issued by the International Searching Authority in counterpart International Application No. PCT/KR2014/000911.
Communication dated Jun. 28, 2016, issued by the European Patent Office in counterpart European Application No. 14154177.1.
Communication dated Dec. 20, 2016 issued by the Russian Patent Office in counterpart Russian Patent Application No. 2015138142.
Communication dated Mar. 28, 2018, from the State Intellectual Property Office of People's Republic of China in counterpart Application No. 201410046814.9.
Communication dated Feb. 5, 2018, from the Japanese Patent Office in counterpart application No. 2014-023119.
Communication dated Oct. 15, 2018, issued by the Japanese Patent Office in counterpart Japanese Application No. 2014-23119.
Communication dated Nov. 2, 2018, issued by the European Patent Office in counterpart European Application No. 14154177.1.
Communication dated Dec. 11, 2018, issued by the State Intellectual Property Office of P.R. China in counterpart Chinese Application No. 201410046814.9.
Communication dated Jul. 16, 2019, issued by the European Patent Office in counterpart European Application No. 19176882.9.
Communication dated Jul. 8, 2019, issued by the State Intellectual Property Office of P.R. China in counterpart Chinese Application No. 201410046814.9.
Communication (CN OA) dated Jan. 17, 2020 by the State Intellectual Property Office of P.R. China in counterpart Chinese Patent Application No. 201410046814.9.
Communication (KR NOA) dated Feb. 10, 2020 by the Korean Intellectual Property Office in counterpart Korean Patent Application No. 10-2013-0102663.
Communication (JP OA) dated Mar. 9, 2020 by the Japanese Patent Office in couunterpart Japanese Patent Application No. 2019-70538.
Communication dated Jun. 22, 2020, from the Japanese Patent Office in counterpart application No. 2019-070538.
Hatano, Jin et al., "Proposal of Content Recommendation and Filtering Technology with User Metadata for Cooperative Broadcasting and Communication", The Institute of Electronics Information and Communication Engineers, Technical Report of IEICE, vol. 104, No. 279, Aug. 27, 2004, pp. 23-28. (6 pages total).
Communication dated Aug. 2, 2020, issued by the Intellectual Property India in counterpart Indian Patent Application No. 530/CHE/2014.

* cited by examiner

<Tablet>

<TV>

<Phone>

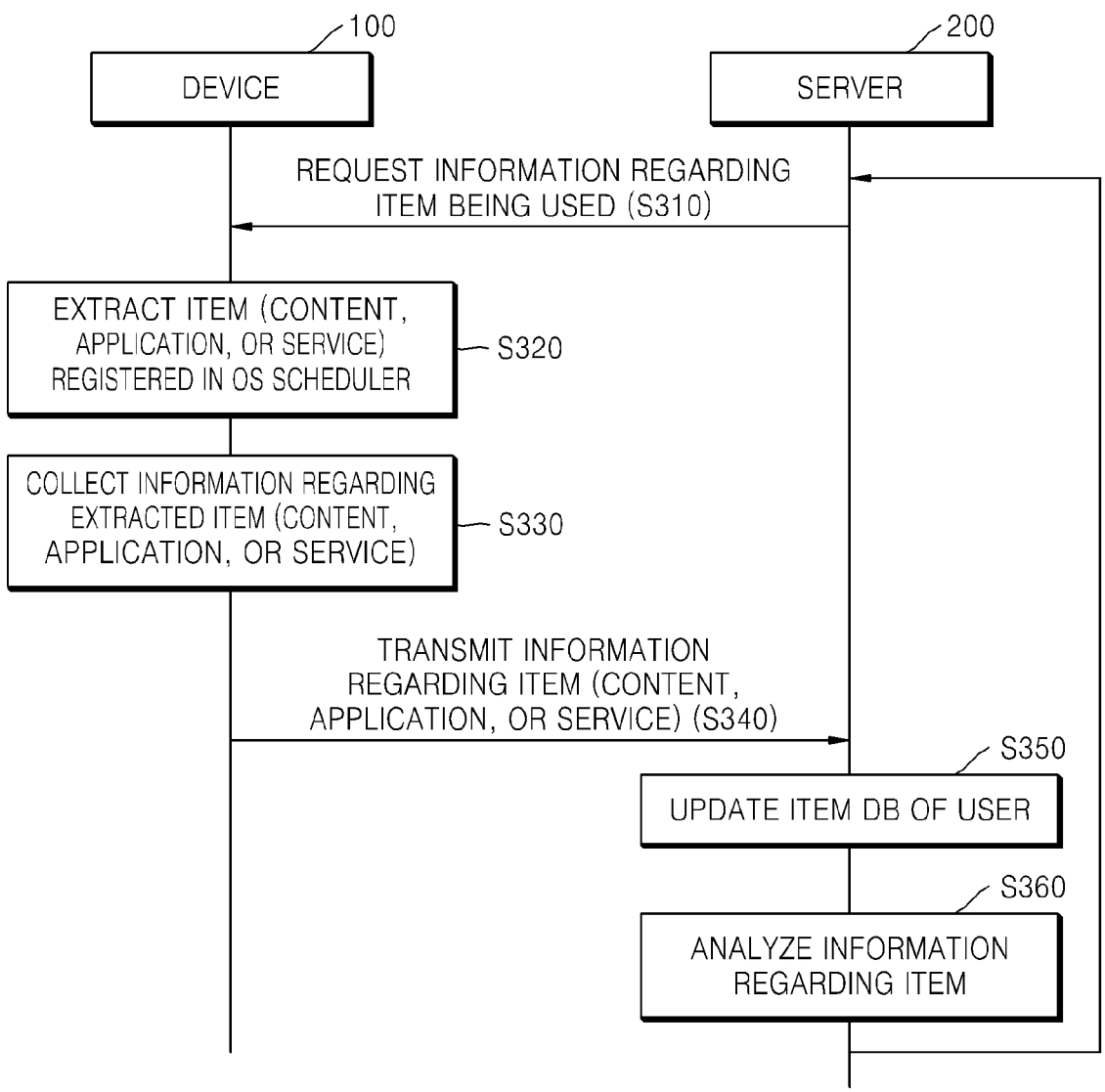

FIG. 7

| metadata | Item | Item 1 | Item 2 | Item 3 | Item 4 | Item 5 | ... |
|---|---|---|---|---|---|---|---|
| (710) BASIC ATTRIBUTE INFORMATION | Title | AAA | BBB | CCC | DDD | EEE | ... |
| | Type | image | Web page | Text | Map | video | ... |
| | Time | 2012.2.3 15:13 | 2012.3.4 4:34 | 2013.2.10 10:40 | 2013.1.6 15:25 | 2013.7.9 22:30 | ... |
| | Genre | family | education | news | movie | song | ... |
| | Duration | 10 second | 3 minute | 5 minute | | 20minute | ... |
| | ... | | | | | | ... |
| (720) CONTEXT INFORMATION | WEATHER | Rain | cloudy | Rain | Cold & snow | fine | ... |
| | TEMPERATURE | 10 degree | 16 | 10 | -10 | 25 | ... |
| | USER STATUS | Public transportation | home | work | outdoor | running | ... |
| | COLLECTION PATH | User interaction | monitoring | User interaction | monitoring | User interaction | ... |
| | COLLECTION DEVICE | phone | tablet | phone | tablet | TV | ... |
| | ... | | | | | | ... |

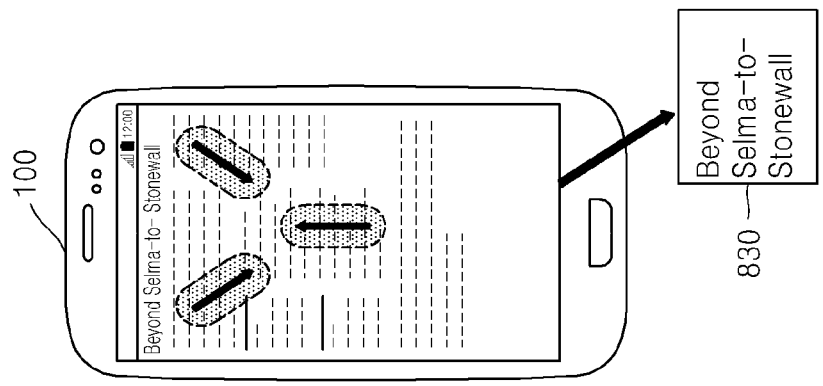
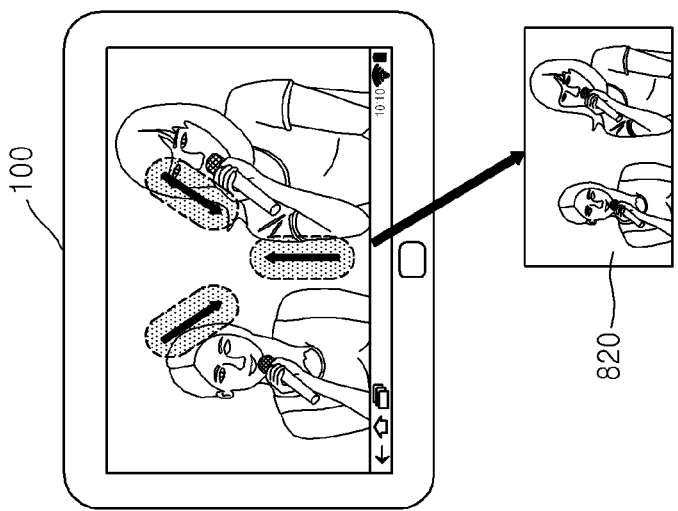
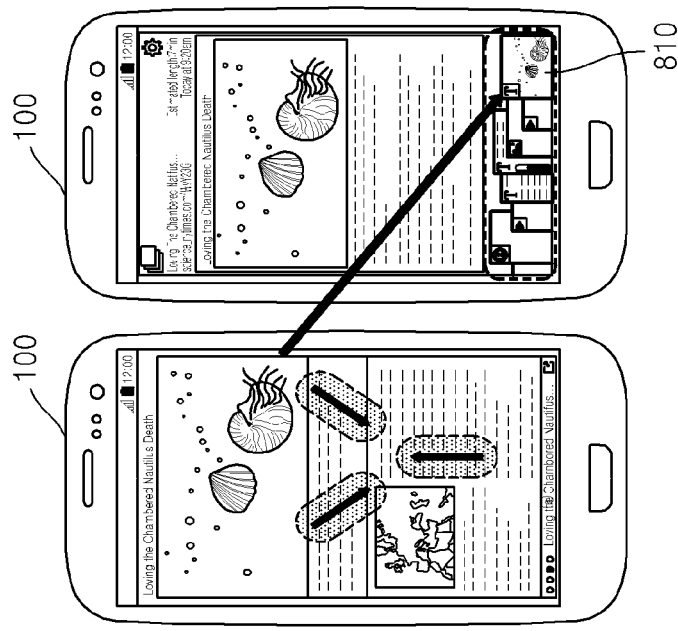

METHOD AND DEVICE FOR PROVIDING RECOMMENDATION PANEL, AND METHOD AND SERVER FOR PROVIDING RECOMMENDATION ITEM

RELATED APPLICATIONS

This application claims priority from Korean Patent Application No. 10-2013-0014653, filed on Feb. 8, 2013, and Korean Patent Application No. 10-2013-0102663, filed on Aug. 28, 2013 in the Korean Intellectual Property Office, the disclosures of which are incorporated herein in their entireties by reference.

BACKGROUND

1. Field

One or more exemplary embodiments relate to a method of providing a recommendation item according to each type of a device and a method and system for providing a recommendation panel including the recommendation item according to each type of device.

2. Description of the Related Art

With the diversification of electronic devices, types of electronic devices that each individual person possesses have also become diversified. Users consume various services, applications, and content by using their electronic devices. Content available to users has also been increasing.

Although users may encounter numerous types of content, users frequently encounter meaningless content, which may cause an increase in user fatigue.

Thus, there is demand for a system that efficiently recommends meaningful content and applications to users according to the devices that they possess.

SUMMARY

One or more exemplary embodiments include a method in which a device provides a recommendation panel including a recommendation item according to each type of a device when a user input is received by simultaneously providing the recommendation panel according to the user input and requesting the recommendation item from a server, and a method in which the server provides at least one recommendation item for each device by analyzing item use pattern information for each device.

Additional aspects will be set forth in part in the description which follows and, in part, will be apparent from the description, or may be learned by the practice of exemplary embodiments.

According to an exemplary embodiment, a device is provided. The device includes: a user input which is configured to receive a user touch input; a communicator which is configured to transmit a recommendation item request comprising identification information of the device to a server in response to the user touch input and receive at least one recommendation item selected based on the identification information of the device from the server; a display which is configured to display a recommendation panel comprising the received at least one recommendation item; and a controller which is configured to control the communicator to receive the at least one recommendation item and control the display to display the recommendation panel, by using a resident program installed in the device, wherein the recommendation panel is displayed based on the user touch input.

The identification information of the device may include at least one piece of device type information, device ID information, device address information, and account information.

The at least one recommendation item may be selected based on at least one piece of item use pattern information of the device, hardware information of the device, and software information of the device.

The communicator transmits context information obtained from the device to the server in response to the user touch input and the at least one recommendation item may be selected in further consideration of the transmitted context information.

The context information may include at least one piece of location information of the device, status information of the user, environment information within a predetermined range or distance from the device, and schedule information of the user.

The at least one recommendation item may be selected based on a type of the device from among items previously used in the device and another device of the user.

The controller may control the display to display a setting window used to input a recommendation condition and control the user input to receive the recommendation condition from the user through the setting window, and the communicator may transmit a recommendation item request including information regarding the recommendation condition to the server in response to the user touch input, and the at least one recommendation item may be selected in further consideration of the recommendation condition.

The recommendation condition may include at least one of item types, item reproduction time, item use purpose, item collection time, and feelings status information of the user.

The controller may align the at least one recommendation item on the recommendation panel based on at least one piece of collection time information and use frequency information.

The controller may adjust a size of the at least one recommendation item displayed on the recommendation panel according to a capacity of the at least one recommendation item.

The controller may collect information regarding at least one item used in the device and transmits the collected information regarding the at least one item to the server through the communicator.

The controller detects a use status change of the device and collects the information regarding the at least one item registered in an operating system (OS) scheduler.

The information regarding the at least one item may include at least one from among a name of the at least one item, a type of the at least one item, a collection time of the at least one item, an application relating to the at least one item, a configuration component of the at least one item, environment information in relation to when the at least one item is collected, a collection path of the at least one item, device information in which the at least one item is collected, and user status information in relation to when the at least one item is collected.

The controller may collect information regarding at least one item displayed on a screen of the device in response to a collection request gesture of the user with respect to the at least one item displayed on the screen.

The collection request gesture of the user may include a shrink gesture that moves at least three fingers that touch the screen of the device in a direction that the at least three fingers become closer to each other.

The device may further include: an image processer which is configured to generate a thumbnail image corresponding to the at least one item displayed on the screen in response to the collection request gesture.

According to an exemplary embodiment, a recommendation panel providing method performed by a device is provided. The method includes: receiving a user touch input; transmitting a recommendation item request including identification information of the device to a server in response to the user touch input; receiving at least one recommendation item selected based on the identification information of the device from the server; and displaying a recommendation panel including the received at least one recommendation item, wherein the recommendation panel is displayed based on the user touch input, and wherein the transmitting, the receiving, and the displaying are performed by using a resident program installed in the device.

The at least one recommendation item may be selected from the server in further consideration of information regarding a time at which the device requests the at least one recommendation item.

The recommendation item request may include at least one piece of location information of the device and status information of the user and the at least one recommendation item may be selected from the server in further consideration of at least one piece of the location information of the device and the status information of the user.

The at least one recommendation item may be selected based on a type of the device from among items previously used in the device and another device of the user.

The displaying of the recommendation panel may include: aligning the at least one recommendation item on the recommendation panel based on at least one piece of collection time information and use frequency information.

The method may further include: collecting information regarding at least one item used in the device; and transmitting the collected information regarding the at least one item to the server.

The collecting may include: collecting information regarding at least one item displayed on a screen of the device in response to a collection request gesture of the user with respect to the at least one item displayed on the screen.

The method may further include: receiving a selection of one of the at least one recommendation item included in the recommendation panel; and reproducing the selected recommendation item.

According to an exemplary embodiment, a server is provided. The server includes: a storage which is configured to store items uploaded from a plurality of devices of a user; a receiver which is configured to receive, from a device from among the plurality of devices, a recommendation item request comprising information regarding the device; a controller which is configured to select at least one recommendation item from the uploaded items based on the information regarding the device; and a transmitter which is configured to transmit the selected at least one recommendation item to the device.

The controller may select the at least one recommendation item based on at least one piece of item use pattern information of the device, hardware information of the device, and software information of the device.

The controller may select the at least one recommendation item in further consideration of information regarding a time at which the recommendation item request is received.

The recommendation item request may further include context information obtained from the device and the context information may include at least one piece of location information of the device, status information of the device, environment information within a predetermined range or distance from the device, and schedule information of the device.

The controller may select the at least one recommendation item in further consideration of the context information obtained from the device.

The r recommendation item request may include recommendation condition information input by the user from the device and the controller may select the at least one recommendation item in further consideration of the recommendation condition information.

The receiver may receive information regarding the items used in the plurality of devices of the user from the plurality of devices of the user, and the controller may obtain item use pattern information corresponding to each of the plurality of devices of the user by using the information regarding the items used in the plurality of devices of the user.

The transmitter may transmit a request to each of the plurality of devices for information regarding at least one item used in the plurality of devices of the user at a predetermined period.

According to an exemplary embodiment, a recommendation item providing method performed by a server is provided. The method includes: storing items uploaded from a plurality of devices of a user; receiving, from a device from among the plurality of devices, a recommendation item request comprising information regarding the device; selecting at least one recommendation item from the uploaded items based on the information regarding the device; and transmitting the selected at least one recommendation item to the device.

The selecting may include selecting the at least one recommendation item based on at least one piece of item use pattern information of the device, hardware information of the device, and software information of the device.

The selecting may include selecting the at least one recommendation item in further consideration of information regarding a time at which the recommendation item request is received.

The recommendation item request may further include context information obtained from the device; and the selecting may include selecting the at least one recommendation item in further consideration of the context information obtained from the device.

The context information may include at least one piece of location information of the device, status information of the device, environment information within a predetermined range or distance from the device, and schedule information of the device.

The storing may include: obtaining item use pattern information corresponding to each of the plurality of devices of the user by using the items uploaded from the plurality of devices of the user; and storing the obtained item use pattern information.

According to an exemplary embodiment, a method for providing a recommendation on a device, the method includes: transmitting a recommendation item request comprising a type of the device to a server; receiving at least one recommendation item selected based on the type of the device; and displaying the received at least one recommendation item.

The type of the device may be at least one from among a tablet, a television, a mobile phone, a desktop computer, and a laptop.

The recommendation item request may include at least one from among location information of the device and status information of a user of the device, and the at least one recommendation item may be selected from a server in further consideration of at least one from among the location information of the device and the status information of the user.

The at least one recommendation item is selected from a server in further consideration of information regarding a time at which the device transmits the recommendation item request.

BRIEF DESCRIPTION OF THE DRAWINGS

These and/or other aspects will become apparent and more readily appreciated from the following description of the exemplary embodiments, taken in conjunction with the accompanying drawings in which:

FIG. 3 is a flowchart of a method in which a server monitors information regarding an item used in a device according to an exemplary embodiment;

FIG. 7 is a table for explaining information regarding items collected by a plurality of devices of a user according to an exemplary embodiment;

FIGS. 8A, 8B, and 8C are diagrams for explaining a method in which a device generates thumbnail images of items according to an exemplary embodiment;

DETAILED DESCRIPTION OF EXEMPLARY EMBODIMENTS

Figure 1:
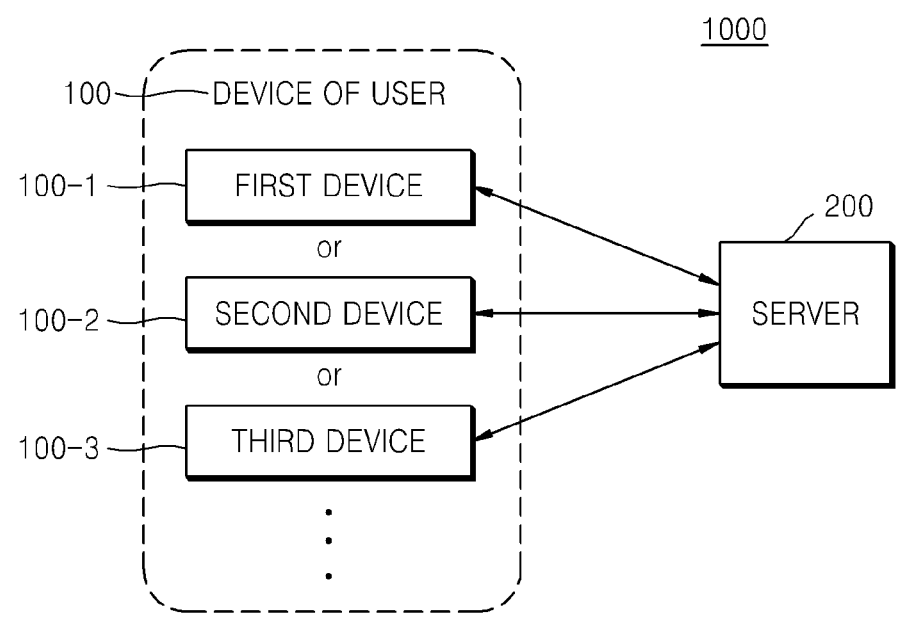
FIG. 1 is a block diagram of an item recommendation system according to an exemplary embodiment.

All terms including descriptive or technical terms which are used herein should be construed as having their plain and ordinary meanings. However, the terms may have different meanings according to an intention of one of ordinary skill in the art, precedent cases, or the appearance of new technologies. Also, some terms may be arbitrarily selected by the applicant, and in this case, the meaning of the selected terms will be described in detail in the detailed description. Thus, the terms used herein have to be defined based on the meaning of the terms together with the description throughout the specification.

Also, when a part "includes" or "comprises" an element, unless there is a particular description contrary thereto, the part may further include other elements, not excluding the other elements. In the following description, terms such as "unit" and "module" indicate a unit for processing at least one function or operation, wherein the unit and the block may be embodied as hardware or software or may be embodied by combining hardware and software.

Throughout the specification, the term "first screen" means a screen that first displays on a device when the device is turned on, the device is unlocked, or an operation mode of the device is switched from a standby mode to an active mode. In one or more exemplary embodiments, the first screen may be, but is not limited to, a home screen of the device, a menu screen of the device, or a background screen of the device. In one or more embodiments, the first screen may be a gateway for the device to provide a service. For example, the device may provide a recommended service via the first screen.

One or more exemplary embodiments will now be described more fully with reference to the accompanying drawings. However, the one or more exemplary embodiments may be embodied in many different forms, and should not be construed as being limited to the exemplary embodiments set forth herein. Rather, these exemplary embodiments are provided so that this disclosure will be thorough and complete, and will fully convey the concept of the one or more exemplary embodiments to those of ordinary skill in the art. In the following description, well-known functions or constructions are not described in detail since they would obscure the one or more exemplar embodiments with unnecessary detail, and like reference numerals in the drawings denote like or similar elements throughout the specification.

As used herein, the term "and/or" includes any and all combinations of one or more of the associated listed items. Expressions such as "at least one of," when preceding a list of elements, modify the entire list of elements and do not modify the individual elements of the list.

FIG. 1 is a block diagram of an item recommendation system 1000 according to an exemplary embodiment.

As illustrated in FIG. 1, the item recommendation system 1000 may include a device 100 and a server 200. However, these elements are not all essential. The item recommendation system 1000 may be implemented with more or less elements than the elements of FIG. 1.

A user may own a plurality of devices (for example, a first device 100-1, a second device 100-2, a third device 100-3, . . . ) The devices (for example, the first device 100-1, the second device 100-2, the third device 100-3, . . . ) that the user owns may be the same type of devices or different types of devices.

According to an exemplary embodiment, each of the devices (for example, the first device 100-1, the second device 100-2, the third device 100-3, . . . ) of the user may be connected to the server 200 by using the same user account. Thus, the server 200 may recognize that the devices 100-1, 100-2, 100-3, . . . are devices of the same user by authenticating account information received from the devices 100-1, 100-2, 100-3, etc. That is, identification information of each of the devices 100-1, 100-2, 100-3, . . . may be connected to the same user account.

Hereinafter, unless otherwise specially mentioned, a device that requests a recommendation item from the server 200 among the devices 100-1, 100-2, 100-3, . . . of the user is defined as the "device 100" according to an exemplary embodiment. That is, the device 100 may be one of the first device 100-1, the second device 100-2, the third device 100-3, etc.

The device 100 according to an exemplary embodiment may be implemented in various forms. For example, the device 100 described in the specification may include a desktop computer, a cellular phone, a smart phone, a laptop computer, a tablet personal computer (PC), an e-book terminal, a digital broadcasting terminal, a personal digital assistant (PDA), a portable multimedia player (PMP), a navigation device, an MP3 player, a digital camera, an Internet protocol TV (IPTV), a digital TV (DTV), a consumer electronics (CE) device (for example, a refrigerator or an air conditioner having a display panel), etc. but is not limited thereto. The device 100 described in the specification may be a wearable device that the user may wear. For example, the device 100 according to an exemplary embodiment may be a wristwatch, glasses, a ring, a bracelet, a necklace, or the like.

The device 100 according to an exemplary embodiment may detect a user input (for example, a recommendation panel request gesture) and display a recommendation panel including the recommendation item received from the server 200 on a predetermined screen. In this regard, the recommendation item means an item that is recommended to the user through the device 100. For example, the recommendation item may include an application, a moving image, a still image, a text file, a web page, etc.

The recommendation item according to an exemplary embodiment may be configured as link information or index information connected to an image of the recommendation item. The recommendation item may be configured as an object for using a service.

The "object for using the service" in the specification means a user interface for using a service of a service provider. The object for using the service may be a user interface for using a service provided from a server or a content provider. The object for using the service may include, for example, a user interface including an icon, text, an image, and link information and a description of a function of the object.

The device 100 according to an exemplary embodiment may receive the object from the server 200 and use the service of the service provider by using the received object. For example, the device 100 may obtain and process content from an application program of the device 100, a data source, the server 200, or the content provider by using the object. The object may be a user interface packaged with predetermined services provided based on context information of a user (or a device).

According to an exemplary embodiment, the object may not be installed in or executed by the device 100 and may be operated or called by a host program (or a resident program) of the device 100 so that the object may be displayed on a screen of the device 100 and may be used by the user. The object may be, for example, a widget, but is not limited thereto.

The recommendation item according to an exemplary embodiment may be referred to as a queue or a universal queue (UQ) according to circumstances.

A seamless sensing platform (SSP) may operate in the device 100 according to an exemplary embodiment, separately from an application processor (AP). The device 100 according to an exemplary embodiment may collect sensing information and recognize a situation by connecting sensors to a sensor hub of the SSP without awakening the AP of a slip mode. The sensor hub (a kind of micro control unit (MCU)) of the SSP awakens the AP of the slip mode when a predetermined situation takes place. The SSP and the AP according to an exemplary embodiment may be implemented as hardware, software, or a combination of the hardware and the software. The SSP will be described in more detail with reference to FIG. 21 later.

The server 200 according to an exemplary embodiment may be a server that provides the recommendation item displayed on the recommendation panel of the device 100.

The server 200 according to an exemplary embodiment may respectively receive information regarding items that are being used in the devices (for example, the first device 100-1, the second device 100-2, the third device 100-3, . . . ) of the user from the devices (for example, the first device 100-1, the second device 100-2, the third device 100-3, . . . ) of the user. In this regard, the server 200 may receive the information regarding the items that are being used in the devices at a predetermined interval or when a specific event occurs in each of the devices.

An item according to an exemplary embodiment may be content, an application, a service, etc. that are used in each of the devices 100-1, 100-2, 100-3, . . . of the user. "Using the item" according to an exemplary embodiment may be construed as executing the item, reproducing the item, displaying the item, etc., but is not limited thereto.

Content according to an exemplary embodiment may include a still image, a moving image, text, a web page, etc., but is not limited thereto. For example, the content may include education content, movie content, broadcasting content, game content, advertisement content, photo content, news content, etc.

An application according to an exemplary embodiment is a computer program set devised to perform a specific task. The application described in the specification may vary. For example, the application may include a game application, a musical instrument play application, a moving image reproduction application, a map application, a broadcasting application, an exercise support application, a payment application, etc. but is not limited thereto.

A "service" according to an exemplary embodiment may vary such as a service provided through the application, a service provided through a widget, a service provided through the AP, etc. For example, the service according to an exemplary embodiment may include a social networking service, a financial payment service, a search service, a multitasking service, etc., but is not limited thereto.

The server 200 according to an exemplary embodiment may communicate with the device 100. For example, the server 200 may receive a recommendation item request from the device 100 and transmit the recommendation item according to the type of the device 100 to the device 100.

The server 200 according to an exemplary embodiment may include an intelligence engine so that the server 200 may analyze event information collected by the device 100 or information regarding the item through the intelligence engine. For example, the server 200 may analyze the event information to infer a user status or a device situation, etc., and analyze metadata of the item, the context information, etc. to obtain item use pattern information for each device.

Therefore, the server 200 according to an exemplary embodiment may provide the device 100 with an item that is expected to be of high interest to the user as the recommendation item in consideration of at least one of hardware information of the device 100, software information, item use pattern information of the device 100, a user status, and a recommendation item request time. This will now be described with reference to FIG. 2.

Figure 2A:
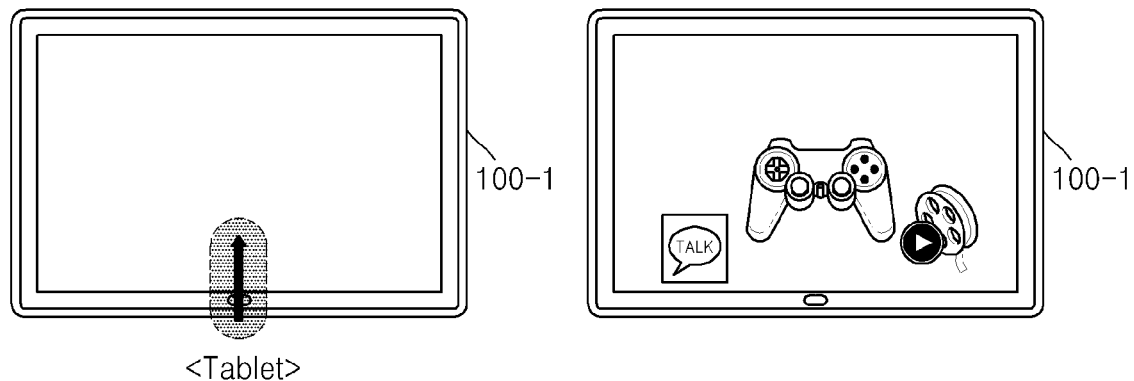
FIGS. 2A, 2B, and 2C illustrate examples of recommendation items provided according to types of devices.
Figure 2B:
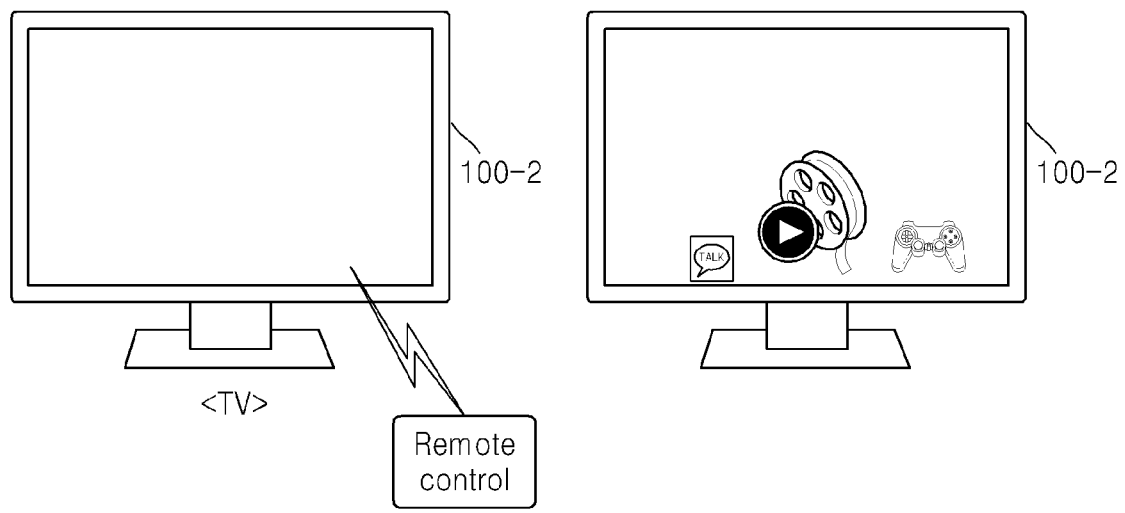
Figure 2C:
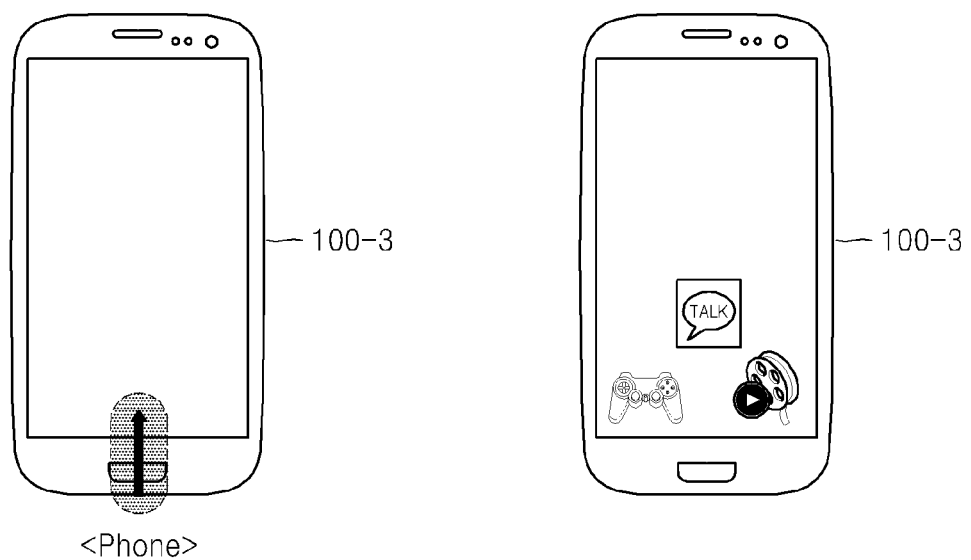

FIGS. 2A, 2B, and 2C illustrate examples of recommendation items provided according to types of the first device 100-1, the second device 100-2, and the third device 100-3.

The examples in which the first device 100-1 is a tablet PC, the second device 100-2 is an IPTV, and the third device 100-3 is a mobile phone as shown in FIGS. 2A, 2B, and 2C are described. In this regard, the first device 100-1, the second device 100-2, and the third device 100-3 may be devices connected to an account (for example, ABC) of the same user. That is, the first device 100-1, the second device 100-2, and the third device 100-3 may be devices that the same user possesses.

Referring to FIG. 2A, when the first device 100-1 detects a user gesture that involves dragging or flicking a predetermined region of a touch screen, the first device 100-1 may request a recommendation item from the server 200 while transmitting information (for example, device type information, a device ID, account information, device address information, etc.) regarding a type of the first device 100-1 to the server 200.

In this regard, the server 200 may acknowledge that the type of the first device 100-1 which requests the recommendation item is the tablet PC and provide a game application, e-book content, etc. that have high use frequency in the tablet PC as recommendation items. In this case, the first device 100-1 may display the game application, the e-book content, etc. that are recommended by the server 200 on a recommendation panel.

The game application, the e-book content, etc. that are recommended by the server 200 may be items previously used in the first device 100-1 or may be items used in an external device (for example, the second device 100-2, the third device 100-3, and an external server).

Referring to FIG. 2B, when the second device 100-2 receives a recommendation panel request through a remote controller, the second device 100-2 may request a recommendation item from the server 200 while transmitting information (for example, device type information, a device ID, account information, device address information, etc.) regarding a type of the second device 100-2 to the server 200.

In this regard, the server 200 may acknowledge that the type of the second device 100-2 which requests the recommendation item is the IPTV and provide movie contents having high use frequency in the IPTV as recommendation items. In this case, the second device 100-2 may display the movie contents recommended by the server 200 on a recommendation panel.

The movie contents recommended by the server 200 may be items previously reproduced in the first device 100-1, the second device 100-2, or the third device 100-3.

Referring to FIG. 2C, when the third device 100-3 detects a user gesture that involves dragging, swiping, or flicking a predetermined region of a touch screen, the third device 100-3 may request a recommendation item from the server 200 while transmitting information (for example, device type information, a device ID, account information, device address information, etc.) regarding a type of the third device 100-3 to the server 200.

In this regard, the server 200 may acknowledge that the type of the third device 100-3 which requests the recommendation item is the mobile phone and provide social networking service (SNS) applications having high use frequency in the mobile phone as recommendation items. In this case, the third device 100-3 may display the SNS applications recommended by the server 200 on a recommendation panel.

The SNS applications recommended by the server 200 may be applications previously used in the third device 100-3 or may be applications previously used in the first device 100-1 or the second device 100-2.

Therefore, according to an exemplary embodiment, the user may acknowledge at least one recommendation item (content, an application, a service, etc.) that fits a corresponding device through the recommendation panel.

A process in which the server 200 collects and analyzes information regarding items used in the devices 100-1, 100-2, 100-3, . . . of the user to provide a recommendation item will now be described with reference to FIGS. 3 through 5, and then a process in which the server 200 provides the recommendation item for each device by using the collected information regarding the items will be described.

FIG. 3 is a flowchart of a method in which the server 200 monitors information regarding an item that is being used in the device 100 according to an exemplary embodiment.

In operation S310, the server 200 may request information regarding the item (for example, content, an application, a service, etc.) that is being used in the device 100. According to an exemplary embodiment, the server 200 may request the information regarding the item from the device 100 at a predetermined interval.

In operation S320, the device 100 may extract at least one item (for example, content, an application, a service, etc.) registered in the item that is being used, i.e. an operating system (OS) scheduler.

In operation S330, the device 100 may collect information regarding the extracted item. The information regarding the item according to an exemplary embodiment may include basic attribute information of the extracted item, context information in relation to the time when the information regarding the item is collected, etc.

For example, the information regarding the item may include at least one of a name of the item, a type thereof (for example, a moving image, a still image, a web page, etc.), a time when the information regarding the item is collected, application information related to the item (for example, version information, operating step information, etc.), a component of the item, environmental information in relation to the time when the information regarding the item is collected (for example, weather, temperature, humidity, etc.), a path for collecting the information regarding the item, information regarding a device that collects the information regarding the item (for example, type information of the device, identification information of the device, etc.), and user status information in relation to the time when the information regarding the item is collected, but is not limited thereto. The device 100 according to an exemplary embodiment may obtain the information regarding the item through an AP, a web, a sensor of the device 100, etc. For example, the device 100 according to an exemplary embodiment may collect position information of the device 100, network information, user status information, etc.

The user status information, which is information regarding a movement of the user, a living pattern, etc., may include information regarding a waking status of the user, an exercising status, a driving status, a sleeping status, etc. For example, when the user connects the device 100 to a stand, a cradle or a mobile docking station at home, the device 100 may determine that the user is in the sleeping status in consideration of position information, tilt information, movement information, current time information, alarm setting information, etc. When the user connects the device 100 to a windshield holder or a mobile docking station in a car, the device 100 may determine that the user is in the driving state in consideration of position information, tilt information, movement information, etc. In particular, user status information may be an activity of the user, location of the user, etc.

The device 100 may collect information such as identification information of an application that is installed, used, and searched by the user, a type of the application, a use time of the application, a use period of the application, etc.

The device 100 may minimize power consumption due to collection of information by collecting the information regarding the item that is being used through a SSP.

In operation S340, the device 100 may transmit the information regarding the item to the server 200. The device 100 according to an exemplary embodiment may transmit the information regarding the item to the server 200 through wired and wireless communication.

In operation S350, the server 200 may update an item database (DB) of the user by using the information regarding the item received from the server 100.

In operation S360, the server 200 may analyze the information regarding the item received from the device 100. For example, the server 200 may obtain information (i.e., item use pattern information) regarding a type (for example, moving image content) of an item that the user mainly uses in the device 100 by analyzing the information regarding the item received from the device 100.

The server 200 may obtain information regarding an item (for example, horror movie content) that the user mainly uses in the device 100 in hot weather, an item (for example, e-book content) that the user mainly uses in the device 100 in cold weather, an item (for example, news content) that the user mainly uses in the device 100 when commuting (between 8-9 a.m.), an item (for example, car game content) that the user mainly uses in the device 100 at night, an item (for example, exercise checkup content) that the user mainly uses in the device 100 on weekends, etc. by analyzing the information regarding the item received from the device 100.

Although a case where the server 200 monitors an item use status of the device 100 among a plurality of devices that the user possesses is described with reference to FIG. 3 for convenience of description, according to an exemplary embodiment, the server 200 may monitor the item use status of each of the plurality of devices that the user possesses.

A method of uploading the information regarding the item that is being used in the device 100 to the server 200 will now be described with reference to FIG. 4.

Figure 4:
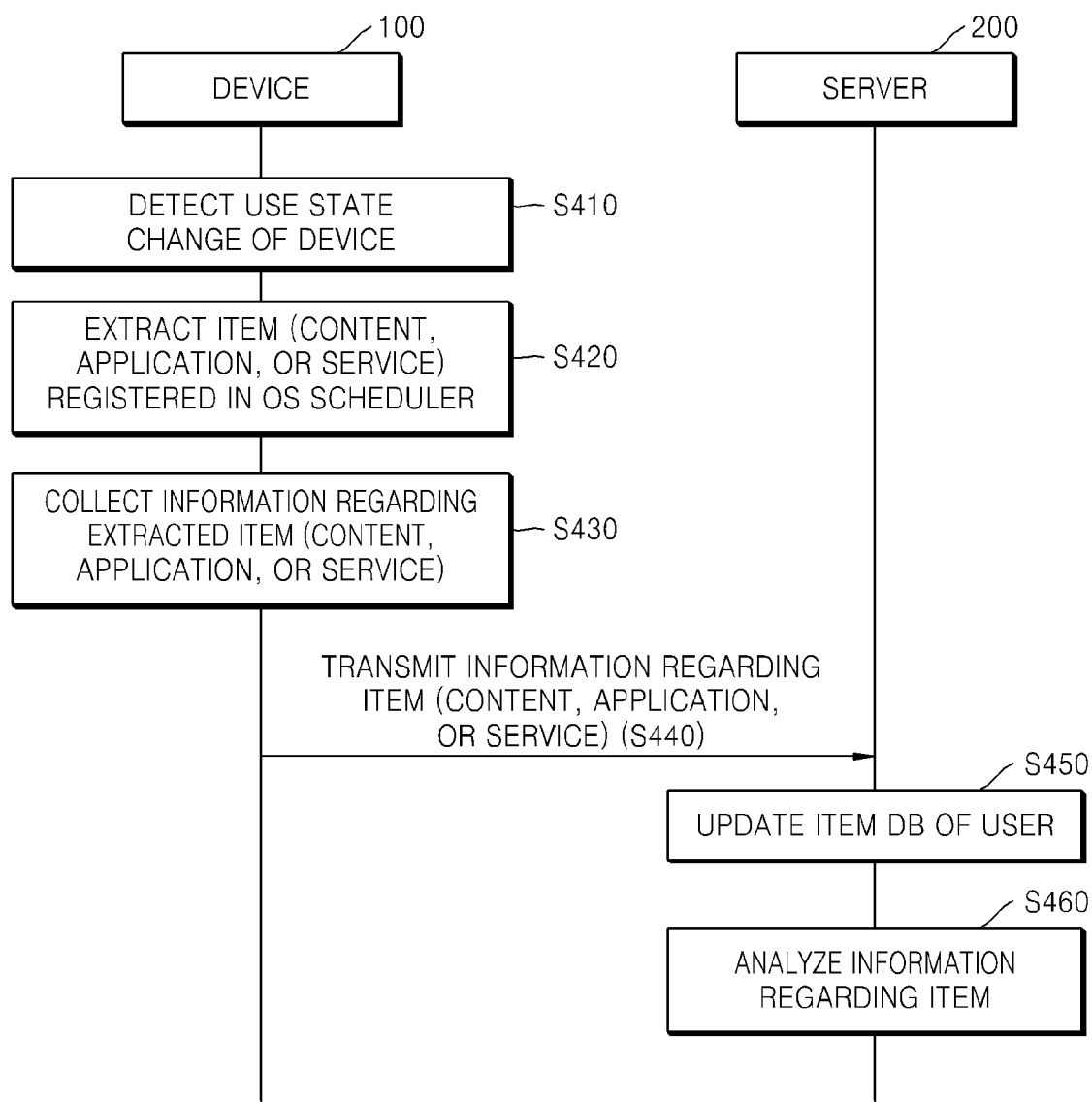
FIG. 4 is a flowchart of a method of uploading information regarding an item that is being used in a device to a server according to an exemplary embodiment.

FIG. 4 is a flowchart of a method of uploading information regarding an item that is being used in the device 100 to the server 200 according to an exemplary embodiment.

In operation S410, the device 100 may detect a use status change of the device 100 or a use status change of the item. For example, the device 100 may detect the use status change such as power on/off, execution of a predetermined application, pausing of reproduction of predetermined content, etc.

In this regard, in operation S420, the device 100 may extract an item registered in an OS scheduler. That is, the device 100 may extract content that is being used, an application, a service, content of which reproduction pauses, etc. The device 100 according to an exemplary embodiment may extract an item of which a use status change is detected from among items registered in the OS scheduler.

In operation S430, the device 100 may collect information regarding the extracted item (for example, content, an application, and a service). For example, when the item is content, the device 100 may collect a name of the content, a type of the content, application information related to the content, reproduction position information of the content, link information used to access the content, content provider information, reproduction period information of the content, etc.

When the item is the application, the device 100 may collect a name of the application, type information of the application, version information of the application, update information of the application, application provider information, reproduction period information of the application, etc.

The device 100 may collect context information of the device 100. The context information according to an exemplary embodiment may include peripheral environment information of the device 100, status information of the device 10, user status information, etc. For example, the device 100 may collect information about weather at the time when the information regarding the item is collected, temperature, humidity, date, time, position, user's feelings, an operating status of the user, a network connection status of the device 100, etc.

In operation S440, the device 100 may transmit the collected information regarding the item to the server 200.

In operation S450, the server 200 may update an item DB of the user by using the information regarding the item received from the device 100.

In operation S460, the server 200 may analyze the information regarding the item received from the device 100 by using an inference algorithm, etc.

Operations S440 through S460 correspond to operations S340 through S360 of FIG. 3, and thus detailed descriptions thereof are omitted.

Figure 5:
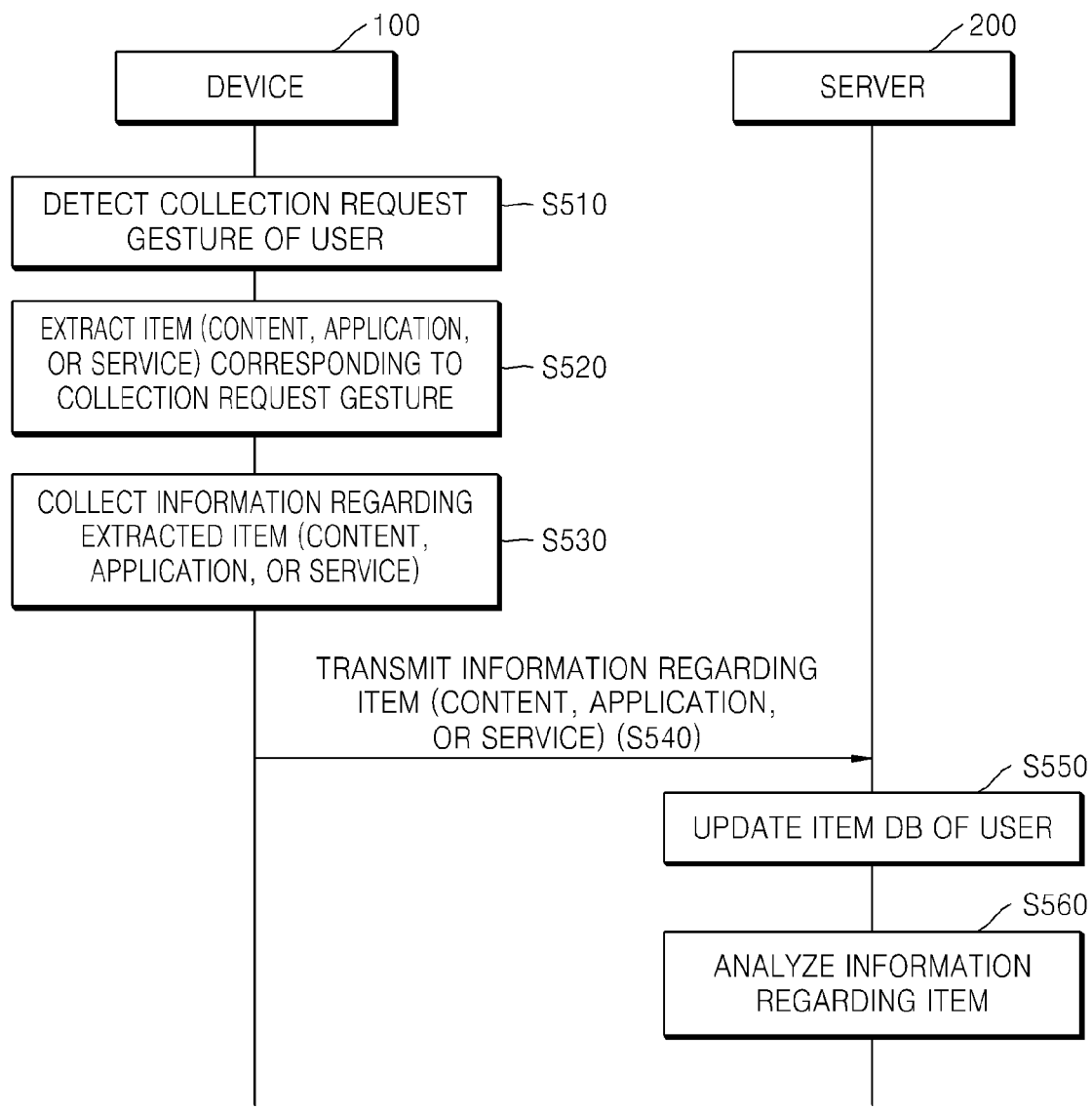
FIG. 5 is a flowchart of a method in which a device transmits information regarding an item that is being used to a server through a user gesture according to an exemplary embodiment.

FIG. 5 is a flowchart of a method in which the device 100 transmits information regarding an item that is being used to the server 200 through a user gesture according to an exemplary embodiment.

In operation S510, the device 100 may detect a collection request gesture of the user. For example, the device 100 may detect the collection request gesture of the user with respect to at least one item displayed on a screen.

The collection request gesture according to an exemplary embodiment may vary. For example, the collection request gesture may include a touch gesture (for example, a drag gesture, a tap gesture, a flick gesture, a drag & drop gesture, a swipe gesture, etc.)

According to an exemplary embodiment, the collection request gesture of the user may include a multi-touch gesture. For example, the collection request gesture of the user may include a shrink gesture that involves pinching a plurality of fingers. According to an exemplary embodiment, the shrink gesture is a movement of at least three fingers that touch the screen of the device 100 in a direction that the at least three fingers become closer to each other.

The collection request gesture of the user according to an exemplary embodiment may include a voice input of the user. When the device 100 is a flexible display apparatus, the collection request gesture of the user may include a bending gesture that bends a predetermined region.

In operation S520, the device 100 may extract an item (for example, content, an application, a service, etc.) corresponding to the collection request gesture of the user.

In operation S530, the device 100 may collect information regarding the item (for example, content, the application, the service, etc.) corresponding to the collection request gesture of the user. In this regard, the device 100 may generate a thumbnail image (or a preview image) regarding the item corresponding to the collection request gesture of the user. This will be described in detail with reference to FIG. 8 later.

In operation S540, the device 100 may transmit the collected information regarding the item to the server 200. The information regarding the item according to an exemplary embodiment may include basic attribute information of the item and/or context information when the information regarding the item is collected. According to an exemplary embodiment, the information regarding the item may include a thumbnail image of the item, link information (for example, a uniform resource locator (URL)), index information, etc.

In operation S550, the server 200 may update an item DB of the user by using the information regarding the item received from the device 100. Operations S540 and S550 correspond to operations S340 and S350 of FIG. 3, and thus detailed descriptions thereof are omitted.

In operation S560, the server 200 may analyze the information regarding the item received from the device 100. In this regard, the item is an item of which collection is directly requested by the user, and thus the server 200 may analyze the information regarding the item received from the device 100 and obtain an item use pattern of the user, item preference information of the user, etc.

According to an exemplary embodiment, the user may simply select content, an application, a service, etc. that the user would like to receive as recommendation items later through a recommendation panel through a specific gesture. This will be described in more detail with reference to FIG. 6.

Figure 6:
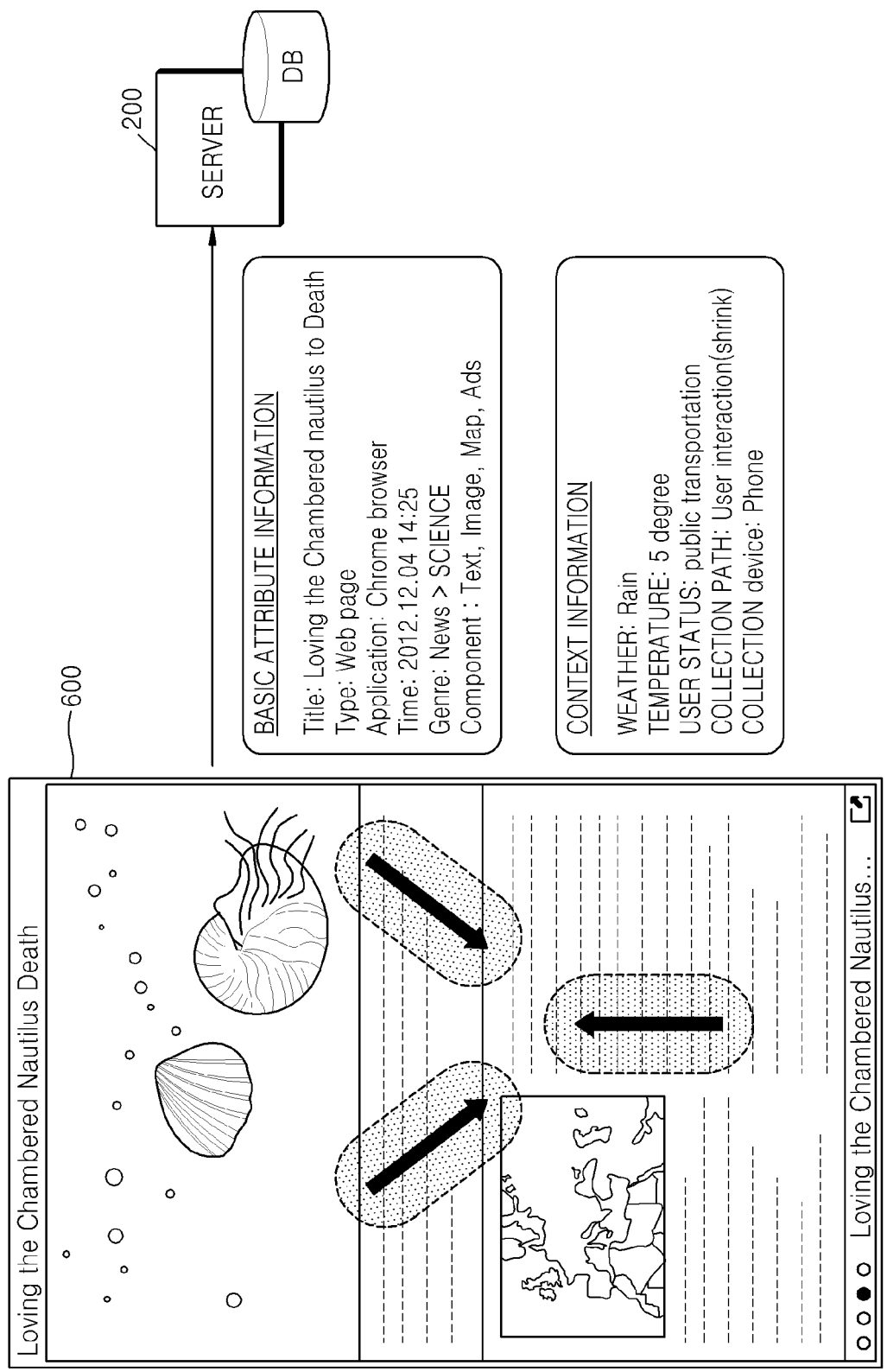
FIG. 6 illustrates an example of a collection request gesture of a user according to an exemplary embodiment.

FIG. 6 illustrates an example of a collection request gesture of a user according to an exemplary embodiment.

Referring to FIG. 6, the device 100 may display a web page item 600 on a screen. In this regard, when the user views web page content and wants to collect the web page item 600, the user may request the device 100 to collect the web page item 600 displayed on the screen of the device 100 through a shrink gesture.

In this regard, the device 100 according to an exemplary embodiment may detect the shrink gesture of the user and collect information regarding the web page item 600 on which the shrink gesture is detected. For example, the device 100 may collect "title: Loving the Chambered Nautilus to Death, type: web page, application: Chrome browser, collection time: 04.12.2012 14:25, genre: news>science, configuration: text, image, map, and advertisement" as basic attribute information of the web page item 600. The device 100 may collect "weather: rainy, temperature: 5° C., user situation: using public transportation, collection path: shrink gesture, collection device: phone" as context information at the time when the web page item 600 is collected.

The device 100 may transmit the collected information (for example, the basic attribute information and the context information) with respect to the web page item 600 to the server 200. In this regard, the device 100 according to an exemplary embodiment may transmit the collected information with respect to the web page item 600 in the form of metadata to the server 200.

The server 200 according to an exemplary embodiment may update an item DB by using the information regarding the web page item 600 received from the device 100. This will be described with reference to FIG. 7 below.

FIG. 7 is a table for explaining information regarding items collected by a plurality of devices of a user according to an exemplary embodiment.

Referring to FIG. 7, the sever 200 according to an exemplary embodiment may establish an item DB by using the information regarding the items collected by the plurality of devices of the user. In this regard, the information regarding the items collected by the plurality of devices may include basic attribute information 710 and context information 720.

The basic attribute information 710, which is information regarding attributes of the items, may include, for example, names of the items, types of the items, genre of the items, reproduction lengths of the items, thumbnail images of the items, link information of the items, etc., but is not limited thereto.

The context information 720, which is information regarding statuses collected by the device 100 when the items are collected, may include weather, temperature, a position, a user status, user's feelings, collection paths, identification information of the device 100 that collects the items, information regarding a type of the device 100, etc., but is not limited thereto.

For example, when the server 200 receives information regarding an "item 1" collected by the first device 100-1 from the first device 100-1, the server 200 may store and manage basic attribute information (title: AAA, type: image, collection time: 03.02.2012 15:13, genre: family image, reproduction length: 10 seconds, thumbnail image, etc.) regarding the "item 1" and context information (weather: rainy, temperature: 10° C., user situation: using public transportation, collection path: shrink gesture, collection device: phone, etc.) in an item DB. For example, the server 200 may classify the item DB according to a new standard or extract an item that fits a predetermined condition from the item DB.

The server 200 according to an exemplary embodiment may extract a recommendation item corresponding to a type of the device 100 by using the item DB when a recommendation item request is received from the device 100. The server 200 may select a recommendation item in further consideration of context information of the device 100 from the item DB. The server 200 according to an exemplary embodiment may select a recommendation item that fits a recommendation condition input by the user by using the item DB.

The server 200 according to an exemplary embodiment may analyze the information (or the item DB) regarding the items collected by the plurality of devices of the user and obtain and manage item use pattern information for each device, item use pattern information for each position, item use pattern information for each user situation (or feelings), item use pattern information for each weather, etc.

FIGS. 8A, 8B, and 8C are diagrams for explaining a method in which the device 100 generates thumbnail images 810, 820, and 830 of items according to an exemplary embodiment.

Referring to FIG. 8A, when a collection request gesture (for example, a shrink gesture) of a user is detected with respect to web page content including images and text, the device 100 may generate the thumbnail image 810 corresponding to the web page content by capturing an image part of the web page content and may collect information regarding the web page content.

The device 100 according to an exemplary embodiment may connect link information (information used to access the web page content) of the web page content to the thumbnail image 810 and display the link information and the thumbnail image 810 on a recommendation panel. The device 100 according to an exemplary embodiment may transmit the information (for example, the thumbnail image 810, the link information, etc.) regarding the web page content to the server 200.

Referring to FIG. 8B, when a collection request gesture of the user is detected with respect to image content displayed on an entire screen of the device 100, the device 100 may generate the thumbnail image 820 corresponding to the image content by reducing an image displayed on the entire screen and may collect information regarding the image content. In this regard, the device 100 may transmit the thumbnail image 820 and the information regarding the image content to the server 200.

Referring to FIG. 8C, when a collection request gesture of the user is detected with respect to text content displayed on the entire screen of the device 100, the device 100 may extract title information of the text content displayed on the entire screen and generate the thumbnail image 830 by using the extracted title information. When the title information of the text content is not extracted, the device 100 may generate the thumbnail image 830 by using a first line of the text content. In this regard, the device 100 may transmit the thumbnail image 830 and the information regarding the text content to the server 200.

Figure 9:
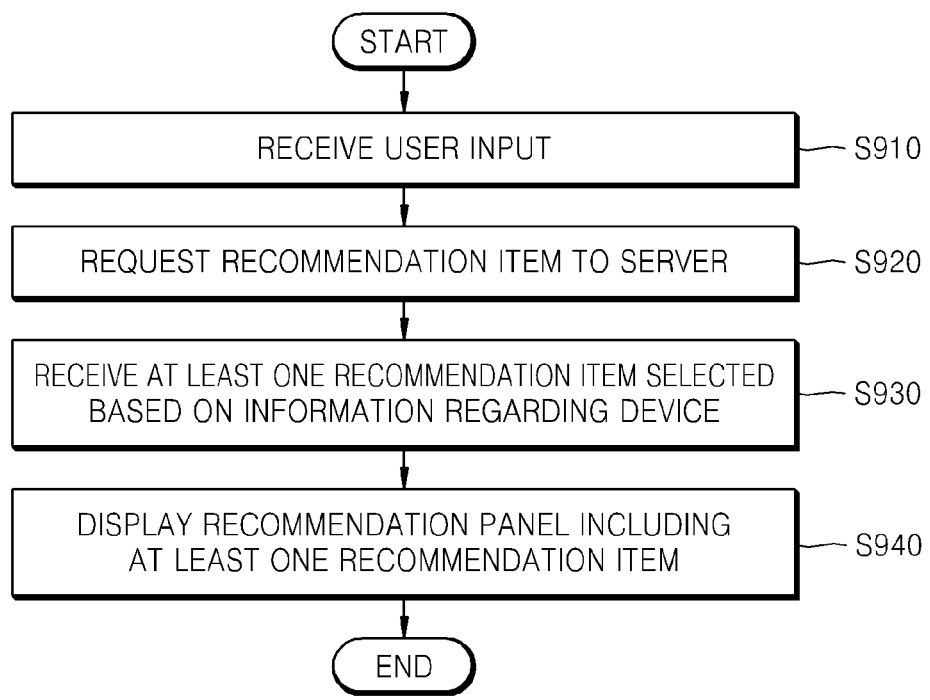
FIG. 9 is a flowchart of a recommendation panel providing method according to an exemplary embodiment.

FIG. 9 is a flowchart of a recommendation panel providing method according to an exemplary embodiment.

In operation S910, the device 100 may receive a user input that requests a recommendation panel. The user input that requests the recommendation panel according to an exemplary embodiment may mean a gesture that requests the recommendation panel including a recommendation item or a user input that requests the recommendation item. For convenience of description, the user input may be expressed as a user gesture.

The user input that requests the recommendation panel according to an exemplary embodiment may vary. For example, the user input that requests the recommendation panel may include a drag gesture that involves dragging a finger or an electronic pen from one side of the screen to another side (for example, a gesture that involves dragging the finger or the electronic pen from a bottom end of a screen to a top end), a gesture that involves selecting a predetermined button (for example, a gesture that involves pressing a home button twice), an unlock gesture, a gesture that involves pressing a predetermined button for more than a predetermined period of time (for example, a gesture that involves pressing a capture button for more than 10 seconds), etc., but is not limited thereto.

A gesture in which the user drags the finger to the top end after touching the finger on a bottom bezel part will be described below as an example of the gesture used to request the recommendation panel for convenience of description.

The recommendation panel according to an exemplary embodiment means a predetermined space or region on which the recommendation item recommended to the user is displayed. The recommendation panel may be displayed on a whole or partial region of the screen.

In operation S920, the device 100 may request recommendation items that are to be displayed on a recommendation panel of the device 100 to the server 200 according to the user input.

In this regard, the device 100 according to an exemplary embodiment may transmit information regarding the device 100 to the server 200. For example, the device 100 may transmit type information (for example, a mobile terminal, a tablet PC, a DTV, a digital camera, an MP3 player, etc.) of the device 100 and identification information (for example, device ID information, device address information, account information, etc.) to the server 200.

The device 100 according to an exemplary embodiment may transmit hardware information of the device 100, software information, etc. to the server 200.

According to an exemplary embodiment, when the type information of the device 100, hardware information, software information, etc. are connected to the identification information (for example, a device ID, a device address, an account, etc.) of the device 100 and are previously stored in the server 200. Although the device 100 transmits only the identification information of the device 100 to the server 200, the server 200 may acknowledge a type of the device 100. Thus, the device 100 may not transmit the type information of the device 100, the hardware information, the software information, etc. to the server 200 and may transmit only the identification information.

The device 100 according to an exemplary embodiment may transmit context information of the device 100 to the server 200.

The context information of the device 100 according to an exemplary embodiment may include environment information collected by the device 100 through sensors when the user input that requests the recommendation panel is received, status information of the device 100, status information of the user that analyzes data collected through sensors, schedule information of the user, etc.

That is, the device 100 may transmit the environment information such as weather, temperature, humidity, intensity of illumination, date, time, etc. when the user input that requests the recommendation panel is received, the status information of the user such as a position of the device 100, a network connection state of the device 100, a movement of the device 100, etc. to the server 200. The device 100 may analyze a message, an e-mail, schedule information, SNS use log information, etc. that are input by the user, infer feelings information (for example, joy, sadness, loneliness, happiness, etc.) of the user, moving status information (for example, exercise, walking, commuting, etc.) of the user, etc., and transmit the inferred feelings information of the user and moving status information of the user to the server 200.

According to another exemplary embodiment, the device 100 may transmit to the message, the e-mail, the schedule information, the SNS use log information that are input by the user, acceleration information of the device 100, position information, etc. to the server 200, and the server 200 may infer the feelings information of the user, the moving status information of the user, etc.

In operation S930, the device 100 may receive at least one recommendation item selected based on information regarding the device 100. For example, the device 100 may receive at least one recommendation item selected based on item use pattern information according to the type of the device 100.

The "item use pattern information" in the specification means result information obtained by analyzing an item use frequency of the user for each device and extracting a type of an item having a high use frequency for each device. For example, when the user reproduces a moving image the most and a game application the second most in a first device, an item use pattern of the first device may be "moving image>e-book content>game application, . . . ."

According to an exemplary embodiment, the device 100 may receive at least one recommendation item selected based on at least one of hardware information (for example, a display size, resolution, whether a touch panel exists, whether a camera exists, etc.) of the device 100, software information (for example, a type of an OS, software version information, whether multitasking exists, etc.), etc.

According to an exemplary embodiment, the device 100 may receive at least one recommendation item selected by the server 200 in further consideration of information regarding a time at which the device 100 requests the recommendation item. The device 100 may receive at least one recommendation item selected by the server 200 in further consideration of at least one of the position information of the device 100 and user status information.

According to an exemplary embodiment, the recommendation item may be an item previously used in the device 100, an item previously used in another device of the user, and an item obtained from an external server. The recommendation item may be an item collected according to a collection request gesture of the user.

The recommendation item according to an exemplary embodiment may include at least one of an application, a moving image, a still image, a text file, a web page, etc., but is not limited thereto.

In operation S940, the device 100 may display the recommendation panel including at least one recommendation item. In this regard, the device 100 may display the recommendation panel on a predetermined screen thereof.

The predetermined screen may include a first screen that is first displayed on the device 100 when an operation mode of the device 100 is switched from a standby mode to an active mode (e.g., when the device 100 is unlocked, power of the device 100 is turned on, etc.) For example, the device 100 may display the recommendation panel on a last page of a plurality of pages having icons arrayed thereon, or may provide the recommendation panel in an object (for example, a widget) for using a service on a predetermined region of a background screen. The first screen may also be the recommendation panel.

When there is a plurality of recommendation items, the device 100 according to an exemplary embodiment may display the plurality of recommendation items in a list on the recommendation panel. According to an exemplary embodiment, the recommendation item displayed on the recommendation panel may be configured as link information or index information connected to an image of the recommendation item.

The device 100 according to an exemplary embodiment may move and display the recommendation panel from one side to another side. For example, when a recommendation panel request gesture of the user is a gesture that involves flicking a finger from a bottom end of the screen to a top end thereof, the device 100 may move the recommendation panel from the bottom end of the screen to the top end thereof to provide the recommendation item.

The device 100 according to an exemplary embodiment may align the at least one recommendation item on the recommendation panel according to a collection time. That is, the device 100 may align the at least one recommendation items in order of the collection time.

According to another exemplary embodiment, the device 100 may align the at least one recommendation item on the recommendation panel based on a frequency of use. That is, the device 100 may align the recommendation item on the recommendation panel in order of popularity. For example, the device 100 may sequentially align the recommendation item from the right of the recommendation panel in descending order of a reproduction number.

According to an exemplary embodiment, when the user input is received, the device 100 may provide the recommendation panel on the predetermined screen in response to the user input and simultaneously transmit recommendation item request information including at least one of the information regarding the device 100 and the context information to the server 200, and display the recommendation item received from the server 200 on the recommendation panel.

The device 100 according to an exemplary embodiment may perform operations S910 through S940 through a resident program installed in the device 100.

The resident program may be a program that executes a task related to an operation of the device 100 according to an exemplary embodiment while operating in a background state. The resident program may automatically operate if a job to be processed occurs and execute a necessary job.

For example, when a user touch input is received, the resident program installed in the device 100 may request the recommendation item from the server 200, receive the recommendation item from the server 200, and display the recommendation panel including the recommendation item on a predetermined region.

According to an exemplary embodiment, the user may acknowledge the recommendation panel including the recommendation item through a touch input that touches a finger on a bottom bezel part and drags the finger to a top end without executing a specific application.

Figure 10A:
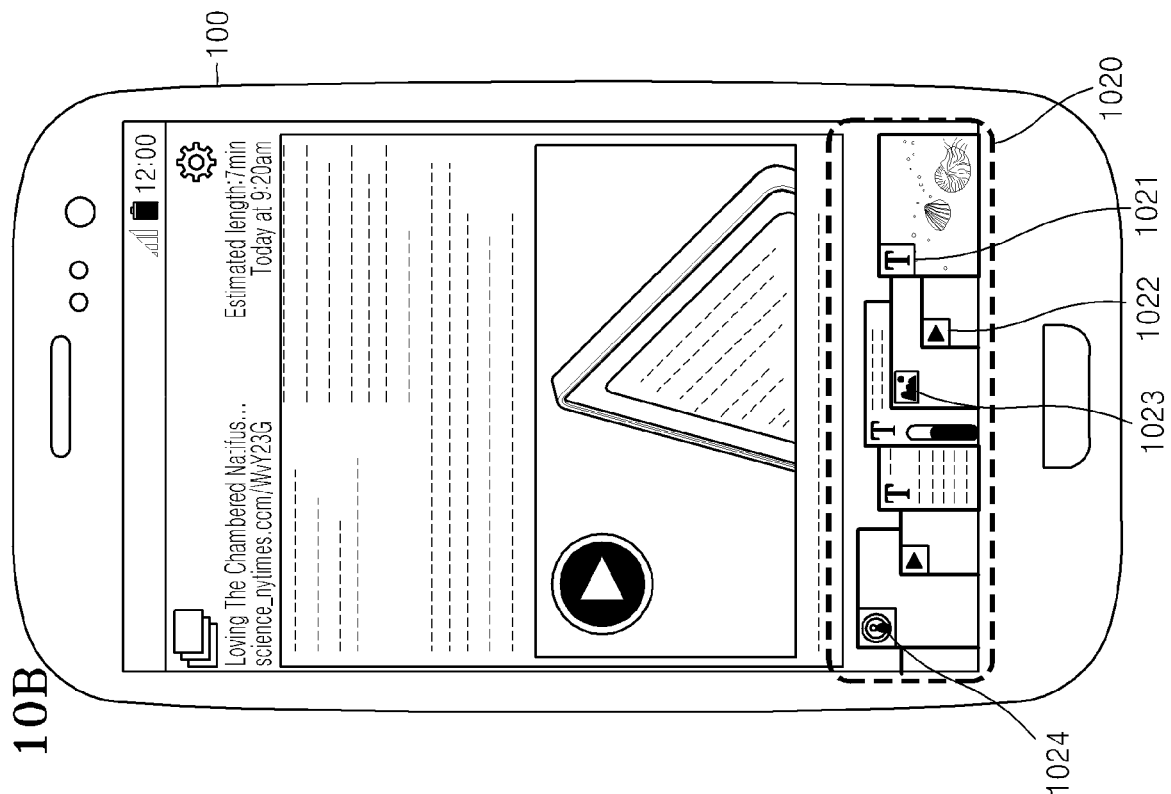
FIGS. 10A and 10B illustrate a recommendation panel according to an exemplary embodiment.
Figure 10B:
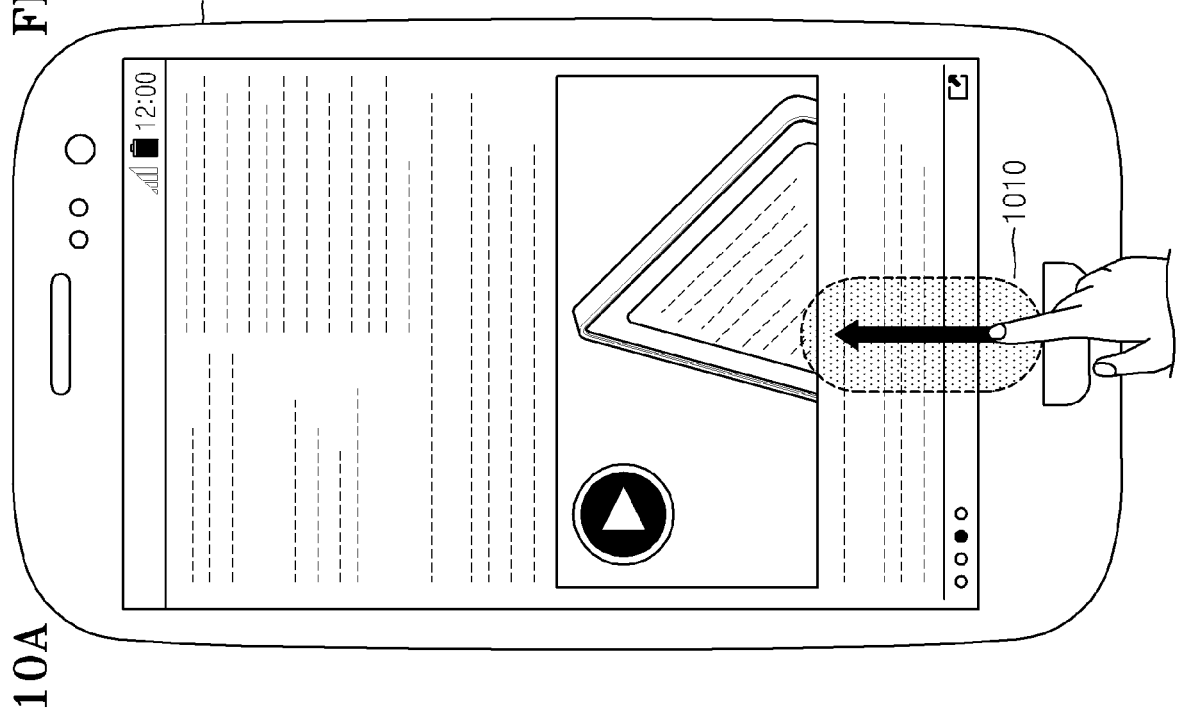

FIGS. 10A and 10B illustrate a recommendation panel 1020 according to an exemplary embodiment.

Referring to FIG. 10A, when a user drags a finger from a bottom end of a screen to a top end thereof, the device 100 may detect a user gesture 1010 that requests the recommendation panel. In this case, the device 100 may request a recommendation item that is to be displayed on the recommendation panel from the server 200. In this regard, the device 100 may transmit information regarding a type of the device 100, identification information, or context information to the server 200.

Referring to FIG. 10B, the device 100 may display the recommendation panel 1020 on the bottom end of the screen. The device 100 may align the recommendation item received from the server 200 on the recommendation panel 1020. The recommendation item may be an item recommended based on the type of the device 100 or the context information thereof.

The recommendation item may be displayed in link information or index information connected to a thumbnail image (or a preview image) generated at the time when items are collected. A plurality of recommendation items according to an exemplary embodiment may overlay each other and may be displayed on the recommendation panel 1020. According to an exemplary embodiment, among the overlaying recommendation items, items having a high use frequency or recently collected items may be displayed on the uppermost part of the recommendation panel 1020. That is, the device 100 may align the plurality of recommendation items on the recommendation panel 1020 based on popularity (evaluation) of the recommendation items or collection time.

According to another exemplary embodiment, sizes of the recommendation items displayed on the recommendation panel 1020 may be adjusted based on the popularity of the recommendation items or a collection time. For example, the higher the use frequency or more recently collected the recommendation items, the larger the images the device 100 may display on the recommendation panel 1020.

According to an exemplary embodiment, the device 100 may align the recommendation items on the recommendation panel 1020 based on capacity information (for example, reproduction length information of the recommendation items) of the recommendation items. For example, the recommendation items may be aligned in ascending order of a reproduction length, and may be displayed on the recommendation panel 1020 by adjusting sizes of the recommendation items according to reproduction lengths.

In this regard, according to an exemplary embodiment, when the recommendation items are text content, the device 100 or the server 200 may estimate a reproduction length of the text content in consideration of an average reading speed of the user, etc.

The recommendation items displayed on the recommendation panel 1020 may have icons indicating item types inserted into the recommendation items. For example, when the recommendation items are text, "T" 1021 may be displayed, when the recommendation items are moving image content, a reproduction display icon "▶" 1022 may be displayed, when the recommendation items are photo content, an icon 1023 indicating a photo may be displayed, and when the recommendation item is broadcasting content, an icon 1024 indicating broadcasting may be displayed.

According to an exemplary embodiment, when a user gesture is performed that involves flicking a predetermined region of the recommendation panel 1020 to the left or right or swiping the predetermined region while touching the predetermined region, the device 100 may scroll the recommendation items aligned on the recommendation panel 1020 according to the user gesture.

Figure 11A:
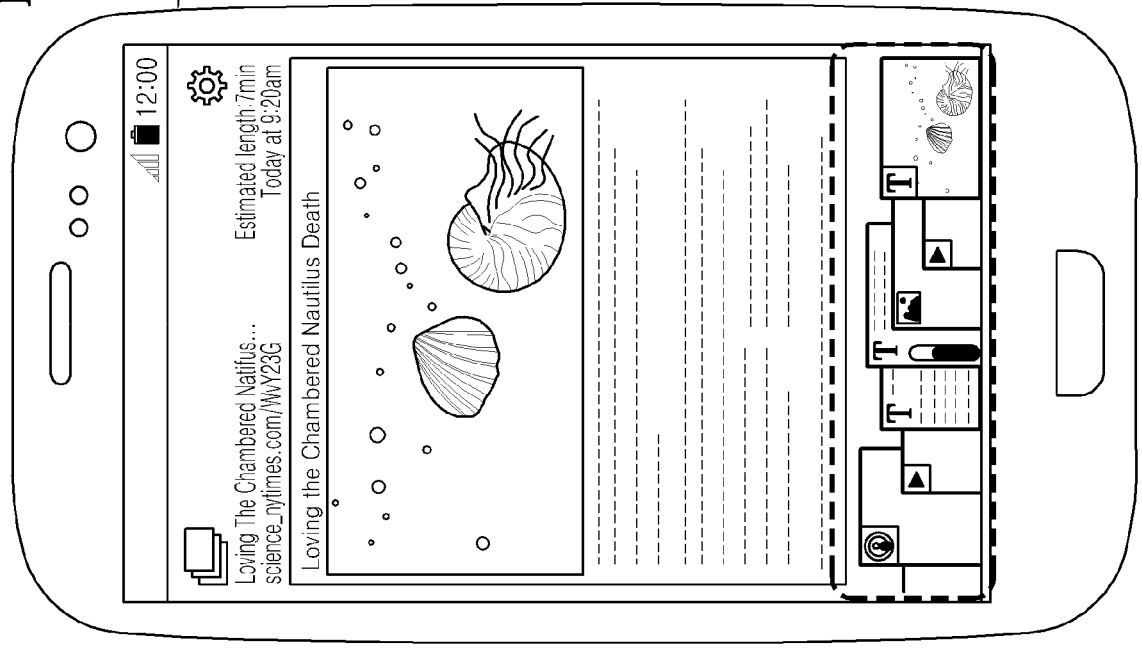
FIGS. 11A and 11B illustrate recommendation panels including different recommendation items for each device according to an exemplary embodiment.
Figure 11B:
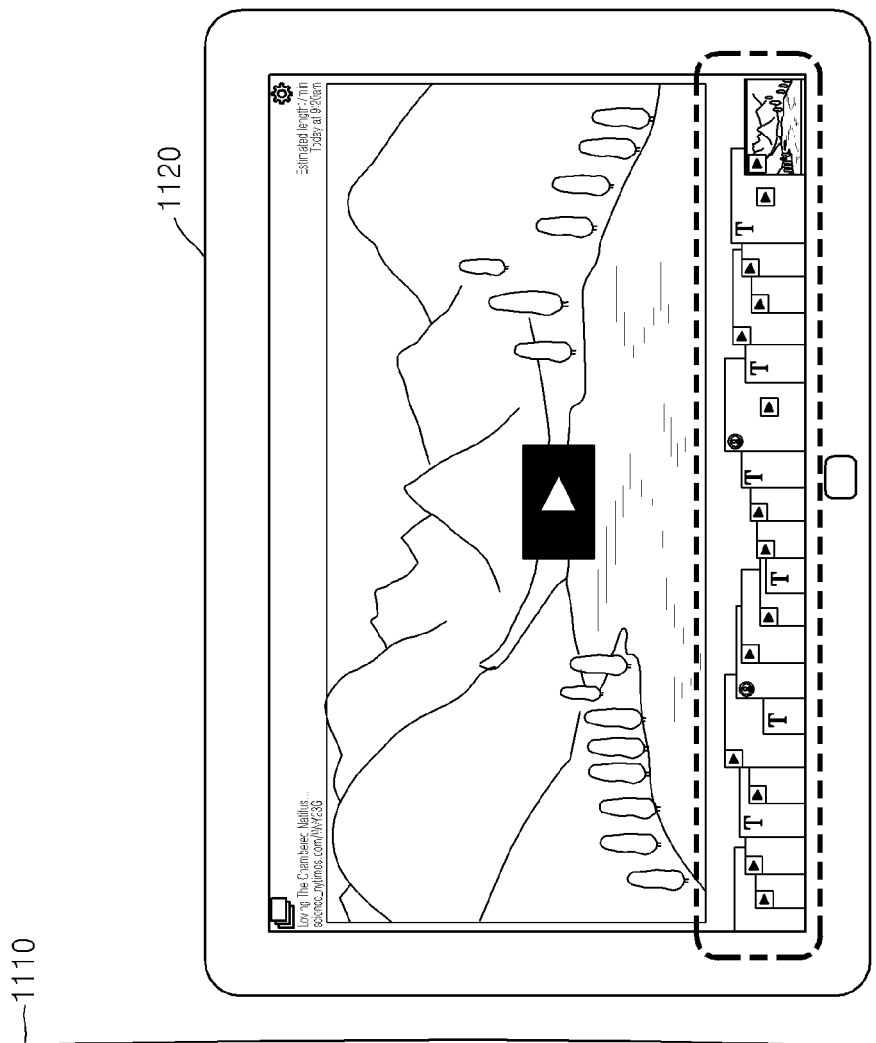

FIGS. 11A and 11B illustrate recommendation panels including different recommendation items for each device according to an exemplary embodiment.

A case in which a user views web pages or text documents mainly through a first device 1110 that is a mobile phone and views moving images mainly through a second device 1120 that is a tablet PC will now be described.

Referring to FIG. 11A, when a recommendation panel request gesture of the user is detected, the first device 1110 may display recommendation items provided by the server 200 based on item use pattern information for each device on a recommendation panel.

For example, since the first device 1110 mainly uses web pages and text documents according to the item use pattern information, the first device 1110 may receive relatively more recommendation items of text than those of moving images or photos from the server 200 and display the recommendation items on the recommendation panel.

Referring to FIG. 11B, when the recommendation panel request gesture of the user is detected, the second device 1120 may display recommendation items provided by the server 200 based on item use pattern information for each device on the recommendation panel.

For example, since the second device 1120 mainly uses moving images according to the item use pattern information, the second device 1120 may receive relatively more recommendation items of moving images than those of still images or text from the server 200 and display the recommendation items on the recommendation panel.

The server 200 may provide the recommendation items in consideration of hardware information for each device. For example, since a screen size of the first device 1110 is greater than that of the second device 1120, the server 200 may provide more recommendation items to the second device 1120 than the first device 1110.

Figure 12:
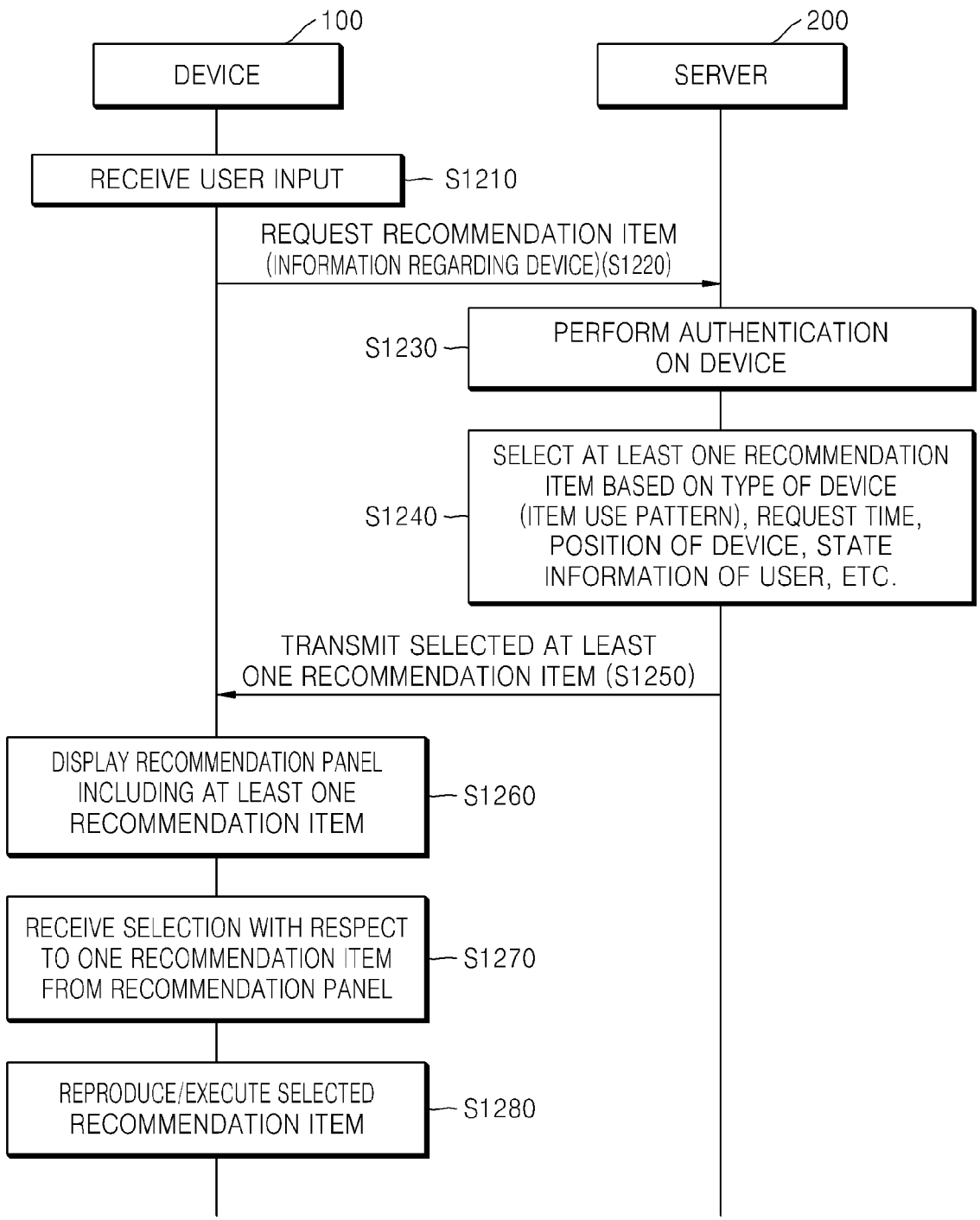
FIG. 12 is a flowchart of a recommendation item providing method according to an exemplary embodiment.

FIG. 12 is a flowchart of a recommendation item providing method according to an exemplary embodiment.

In operation S1210, the device 100 may receive a user input. Operation S1210 corresponds to operation S910 of FIG. 9, and thus a detailed description thereof is omitted here.

In operation S1220, the server 200 may receive a request for recommendation items that are to be displayed on a recommendation panel of the device 100. That is, the device 100 may transmit the recommendation item request including information regarding the device 100 to the server 200 in response to the user input. In this regard, according to an exemplary embodiment, the server 200 may receive at least one of information regarding a type of the device 100, identification information of the device 100, and context information of the device 100 from the device 100. Operation S1220 corresponds to operation S920 of FIG. 9, and thus a detailed description thereof is omitted here.

In operation S1230, the server 200 may perform authentication on the device 100. For example, the server 200 may authenticate whether the device 100 is a device that may provide the recommendation items based on the identification information (for example, a device ID and account information) of the device 100.

According to an exemplary embodiment, the server 200 may receive authentication information from the device 100. The authentication information may be used to authenticate whether the device 100 is a device that is allowed to provide the recommendation items. The authentication information may be information encrypted by using an encryption key previously consulted with the server 200. According to an exemplary embodiment, a plurality of devices of the user may have the same authentication information.

In operation S1240, the server 200 may select at least one recommendation item based on the type of the device 100. For example, the sever 200 may select at least one recommendation item based on item use pattern information of the device 100.

According to an exemplary embodiment, the server 200 may generate the item use pattern information of the device 100 by using information regarding items that are collected by using at least one method of FIGS. 4 through 6 and are used in the device 100. For example, the server 200 may infer a type of content mainly used in the device 100, a type of an application, etc.

Thus, when the server 200 receives a recommendation item request from the device 100, the server 200 may extract item use pattern information corresponding to the device

100 and select a recommendation item that is to be transmitted to the device 100 according to the extracted item use pattern information.

The server 200 according to an exemplary embodiment may select at least one recommendation item based on at least one of hardware information of the device 100 and software information.

For example, the server 200 may adjust the number of recommendation items that are to be provided to the device 100 according to a screen size of the device 100. When the device 100 is an IPTV in which user input is inconvenient, the server 200 may provide recommendation items by changing a graphical user interface (GUI), etc. or may provide recommendation items (for example, a search application that is easy to search by using a remote controller) which allows for a convenient user input. The server 200 may adjust shapes (for example, sizes, lengths, etc.) of recommendation items according to capacity information (for example, reproduction lengths, content sizes, etc.) of recommendation items, and provide the recommendation items whose shapes are adjusted to the device 100.

According to an exemplary embodiment, the server 200 may select at least one recommendation item from items previously used in the plurality of devices of the user. That is, the server 200 may provide the recommendation items to the device 100 based on an item use history of the user.

The server 200 according to an exemplary embodiment may select recommendation items in further consideration of the context information (for example, a recommendation item request time, a position of the device 100, user state information, device state information, user feelings information, etc.) of the device 100.

For example, when a time when the recommendation item request is received from the device 100 is weekday mornings, and the user carrying the device 100 jogs in the morning and reads a newspaper in the morning through the device 100, the server 200 may select music content, news content, etc. that are suitable for preparing for commuting and going to school, morning jogging, and reading of the newspaper as recommendation items.

When a time that the recommendation item request is received from the device 100 is weekday evenings, and the user enjoys animation content along with his/her kids mainly in the evening on weekdays through the device 100, the server 200 may select animation contents having high reproduction frequency as the recommendation items.

According to an exemplary embodiment, when the user is walking as a result of acknowledging the context information received from the device 100, the server 200 may select audio and moving images excluding text items as the recommendation items.

According to an exemplary embodiment, when the user is driving, as a result of acknowledging the context information received from the device 100, the server 200 may select radio broadcasting content, and music content relating to voice as the recommendation items.

The server 200 according to an exemplary embodiment may select a highly popular item as a recommendation item in further consideration of evaluation information of another user.

In operation S1250, the server 200 may transmit the selected at least one recommendation item to the device 100.

In operation S1260, the device 100 may display the recommendation panel including the at least one recommendation item on a screen. Operations S1250 and S1260 correspond to operations S930 and S940 of FIG. 9, and thus detailed descriptions thereof are omitted here.

In operation S1270, the device 100 may receive a selection with respect to at least one of the at least one recommendation item included in the recommendation panel. For example, when the user touches (for example, taps, double taps, swipes, etc.) a region on which content that is to be reproduced is displayed in the recommendation panel, the device 100 may detect a user selection with respect to a touched recommendation item.

In operation S1280, the device 100 may reproduce or execute the selected recommendation item. This will be described in more detail with reference to FIG. 13.

Figure 13B:
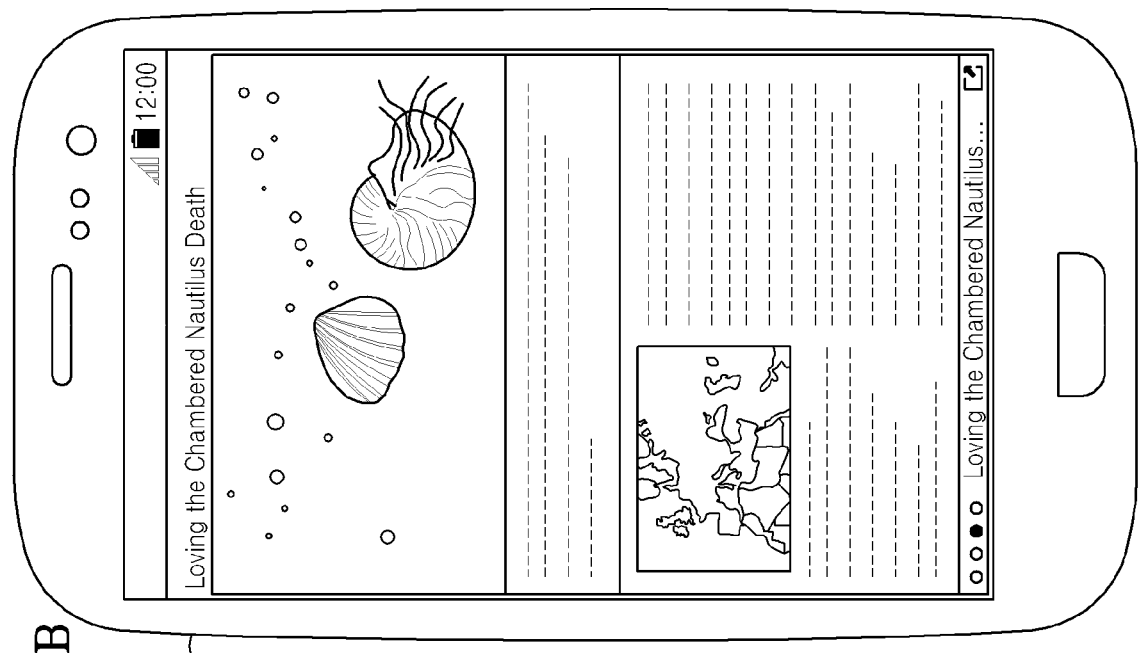
FIGS. 13A and 13B are diagrams for explaining a method of reproducing/executing a recommendation item according to an exemplary embodiment.
Figure 13A:
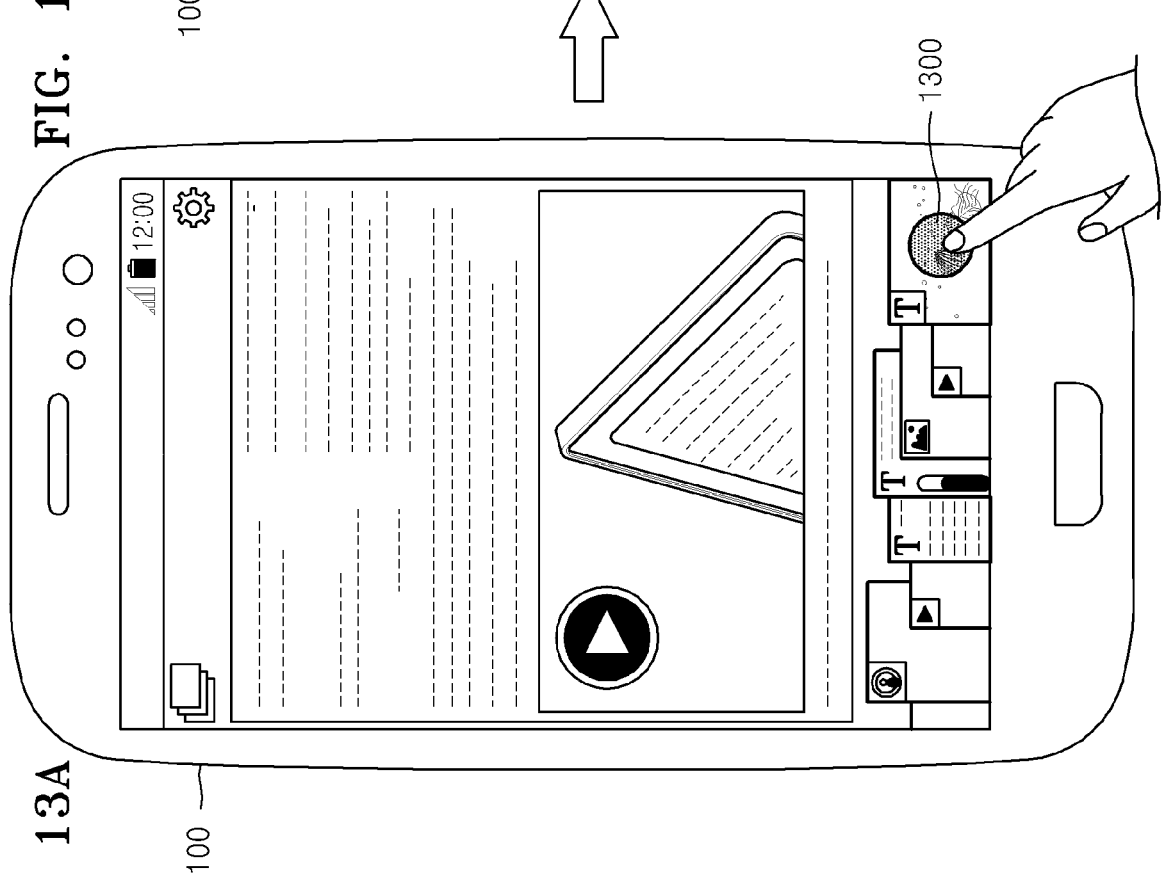

FIGS. 13A and 13B are diagrams for explaining a method of reproducing/executing a recommendation item 1300 according to an exemplary embodiment.

Referring to FIG. 13A, the device 100 may display recommendation items selected based on a type of the device 100 on a recommendation panel. According to an exemplary embodiment, the device 100 may overlay and align recommendation items on the recommendation panel. When a user selects the recommendation item 1300 from the recommendation panel, the device 100 may detect the selected recommendation item 1300.

Referring to FIG. 13B, the device 100 may execute or reproduce the recommendation item 1300 selected by the user. For example, when the selected recommendation item 1300 is a web page, the web page may be displayed on a screen. When the selected recommendation item 1300 is movie content of which reproduction stops, the device 100 may reproduce the movie content after a point of time when the reproduction is stopped. When the recommendation item 1300 selected by the user is an application, the device 100 may execute the application selected by the user. In this regard, when the application selected by the user is not previously installed in the device 100, the device 100 may search for the application in an external server and install a found application in the device 100.

Figure 14:
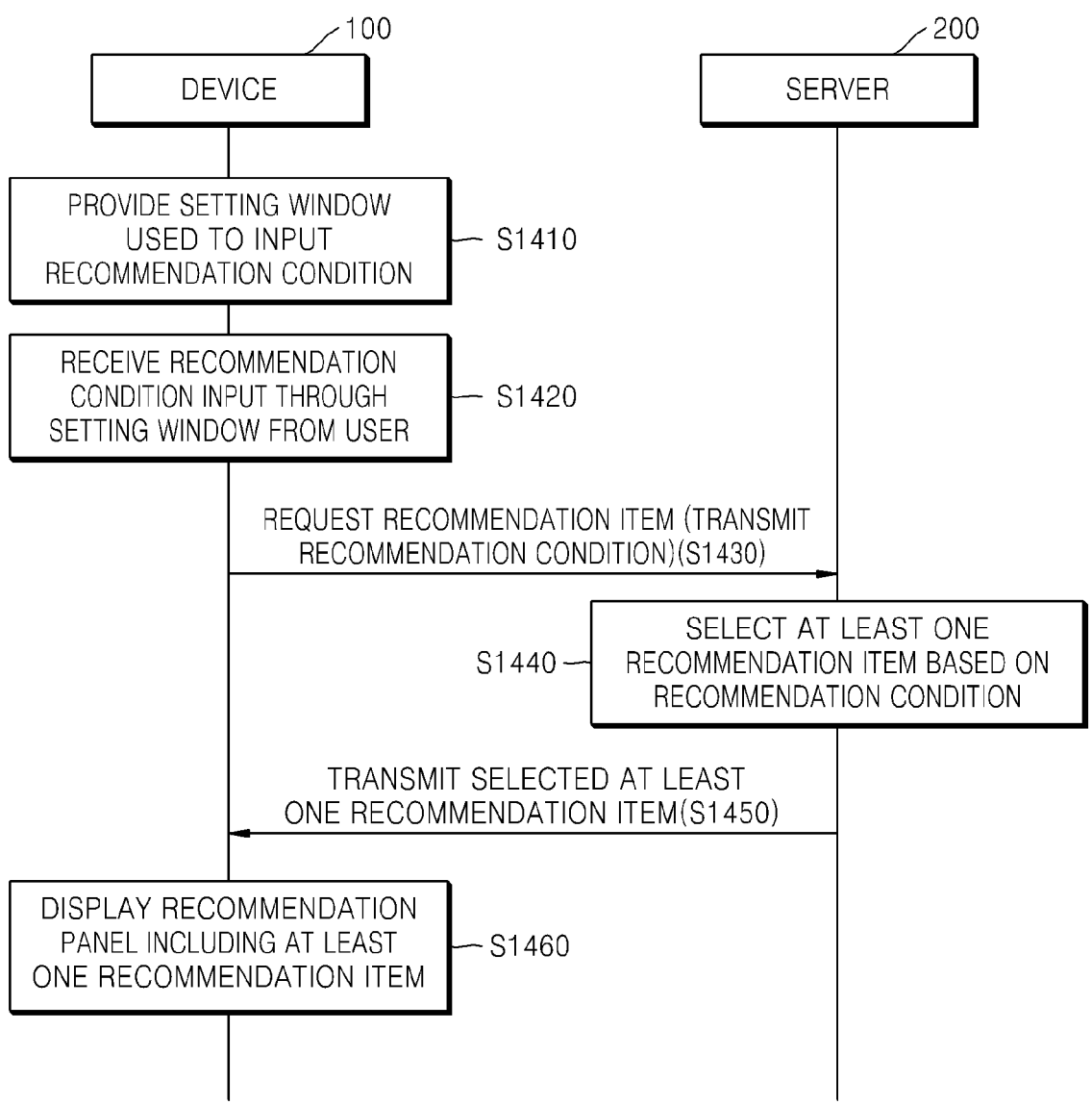
FIG. 14 is a flowchart of a recommendation item providing method based on a recommendation condition of a user according to an exemplary embodiment.

FIG. 14 is a flowchart of a recommendation item providing method based on a recommendation condition of a user according to an exemplary embodiment.

In operation S1410, the device 100 may provide a setting window used to input the recommendation condition. The setting window used to input the recommendation condition may be provided in the form of a GUI.

In operation S1420, the device 100 may receive an input of the recommendation condition through the setting window from the user. For example, the device 100 may receive an input of at least one of item types, item reproduction time, item use purpose, item collection time, and user feelings state information as the recommendation item.

In operation S1430, the device 100 may request recommendation items while transmitting the recommendation condition to the server 200.

In operation S1440, the server 200 may select at least one item based on the recommendation condition. For example, when the user sets a "moving image" among item types and "five minutes" of the item reproduction time as the recommendation condition, the server 200 may select music video contents of five minutes from among music video contents that are mainly reproduced in the device 100.

In operation S1450, the server 200 may transmit the at least one recommendation item selected based on the recommendation condition to the device 100.

In operation S1460, the device 100 may display a recommendation panel including the at least one recommendation item selected based on the recommendation condition. This will be described in more detail with reference to FIG. 15.

Figure 15:
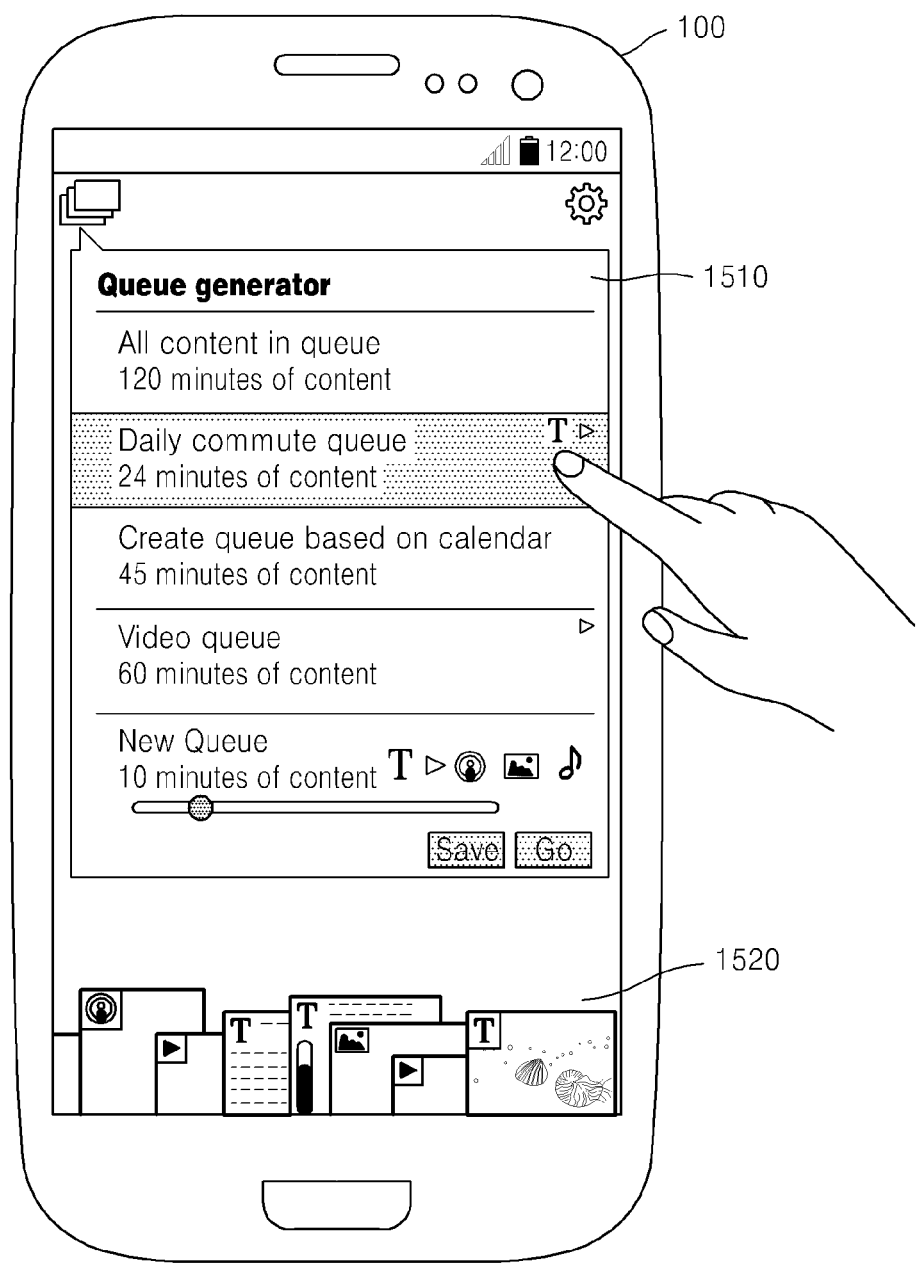
FIG. 15 illustrates a setting window used to input a recommendation condition according to an exemplary embodiment.

FIG. 15 illustrates a setting window 1510 used to input a recommendation condition according to an exemplary embodiment.

Referring to FIG. 15, the device 100 may display the setting window 1510 used to input the recommendation condition on a screen. In this regard, a user may acknowledge menus of the setting window 1510 and input item types, item reproduction time, item use purpose, item collection time, and a feelings state.

For example, when the user is commuting and takes the subway for about 24 minutes, the user may input "item use purpose: items for use in the basement when commuting", "item reproduction time: 24 minutes", "item type: multimedia content", etc. so as to receive recommendation items that may be used when commuting by subway for 24 minutes.

In this regard, the device 100 may request recommendation items that are to be displayed on a recommendation panel 1520 while transmitting the recommendation condition input by the user to the server 200. The server 200 may select recommendation items in consideration of the recommendation condition input by the user, an item use pattern of the device 100, hardware information of the device 100, software information, etc. and may transmit the selected recommendation items to the device 100. For example, when the user mainly reads an electronic newspaper while commuting, the server 200 may select the recommendation items relating to electronic newspaper content, news moving image content, etc.

When the user selects "commuting" as the recommendation condition, the device 100 may commute by subway and automatically extract information that the user takes subway for 24 minutes while commuting based on previously collected event information, and transmit the extracted information to the server 200.

The device 100 may receive the recommendation items selected based on the recommendation condition input by the user from the server 200 and display the received recommendation items on the recommendation panel 1520.

Figure 16A:
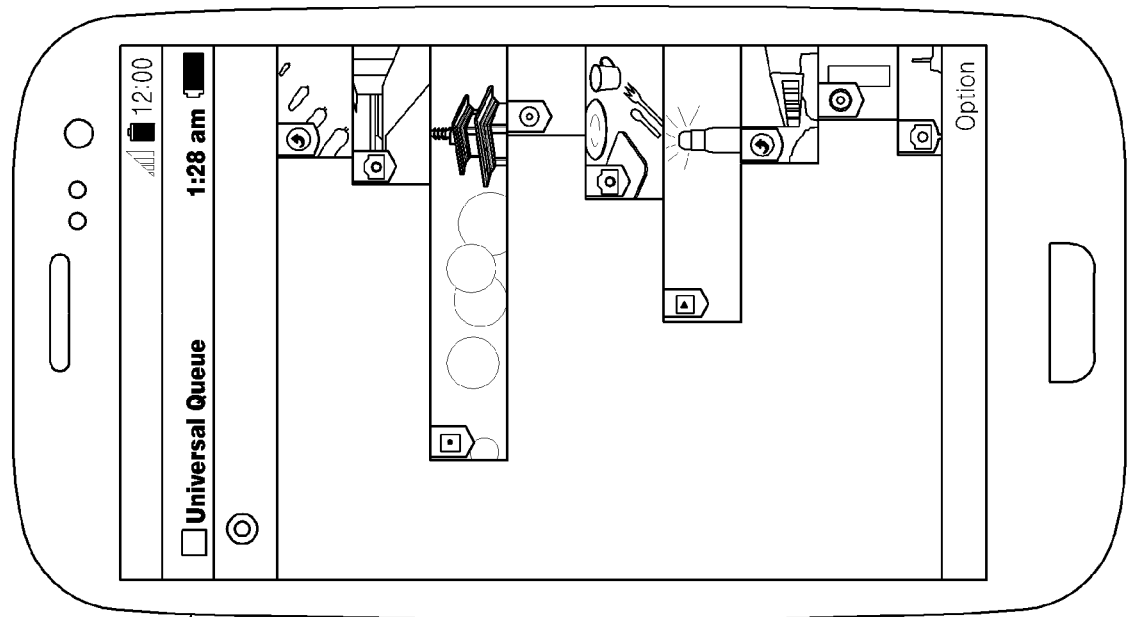
FIGS. 16A and 16B illustrate recommendation item lists according to an exemplary embodiment.
Figure 16B:
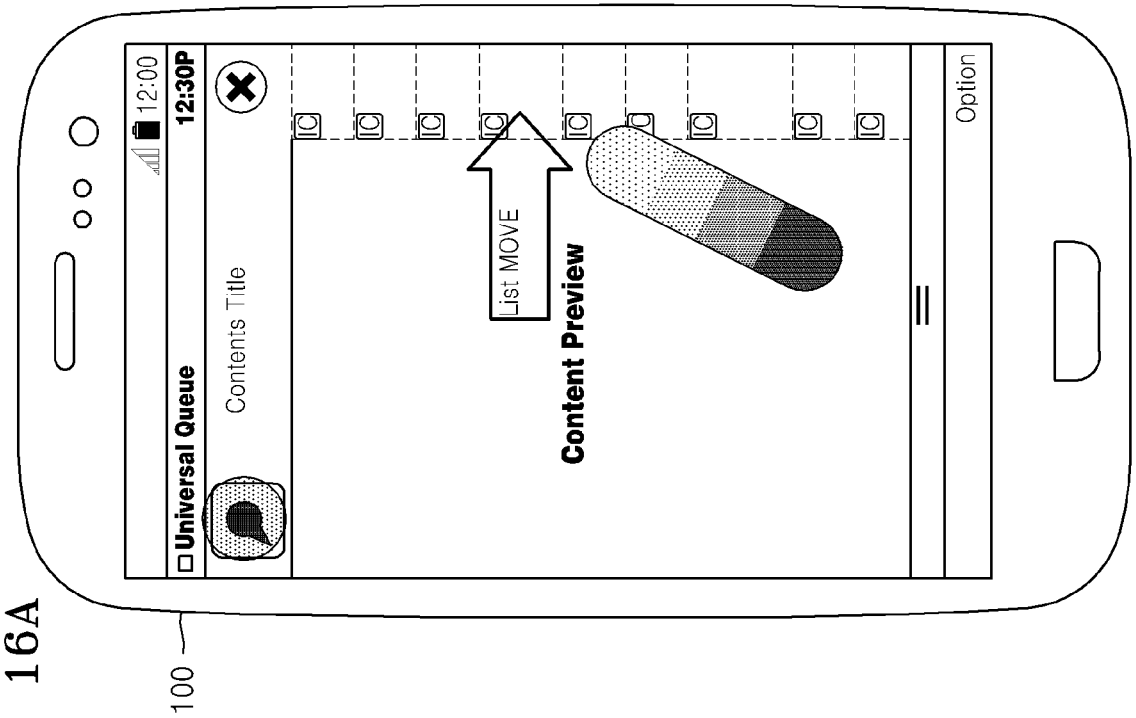

FIGS. 16A and 16B illustrate recommendation item lists according to an exemplary embodiment.

Referring to FIG. 16A, the device 100 may provide an editing window used to edit the recommendation item list displayed on a recommendation panel. A user may acknowledge the recommendation item list displayed on the recommendation panel through the editing window and may change an arrangement order of the recommendation item list.

For example, according to an exemplary embodiment, the device 100 may detect a user touch gesture (for example, a tap gesture, a drag & drop gesture, etc.) and may change positions of recommendation items according to the user touch gesture.

The device 100 according to an exemplary embodiment may provide previews of recommendation items selected by the user through the editing window.

Referring to FIG. 16B, according to an exemplary embodiment, a plurality of recommendation items may be displayed on the recommendation panel by differently adjusting a size of a thumbnail image corresponding to each of the recommendation items according to reproduction time lengths.

The device 100 according to an exemplary embodiment may adjust sizes of thumbnail images according to relative reproduction time lengths between the recommendation items and according to absolute reproduction time lengths therebetween.

The device 100 according to an exemplary embodiment may predict reproduction time lengths of text content in consideration of a user capability. For example, when a user AAA of the device 100 reads text twice as fast as general users on average, if general users read XYZ content for 10 minutes on average, the device 100 may expect a reproduction time length of the XYZ content in consideration of a reading capability of the user AAA.

Figure 17B:
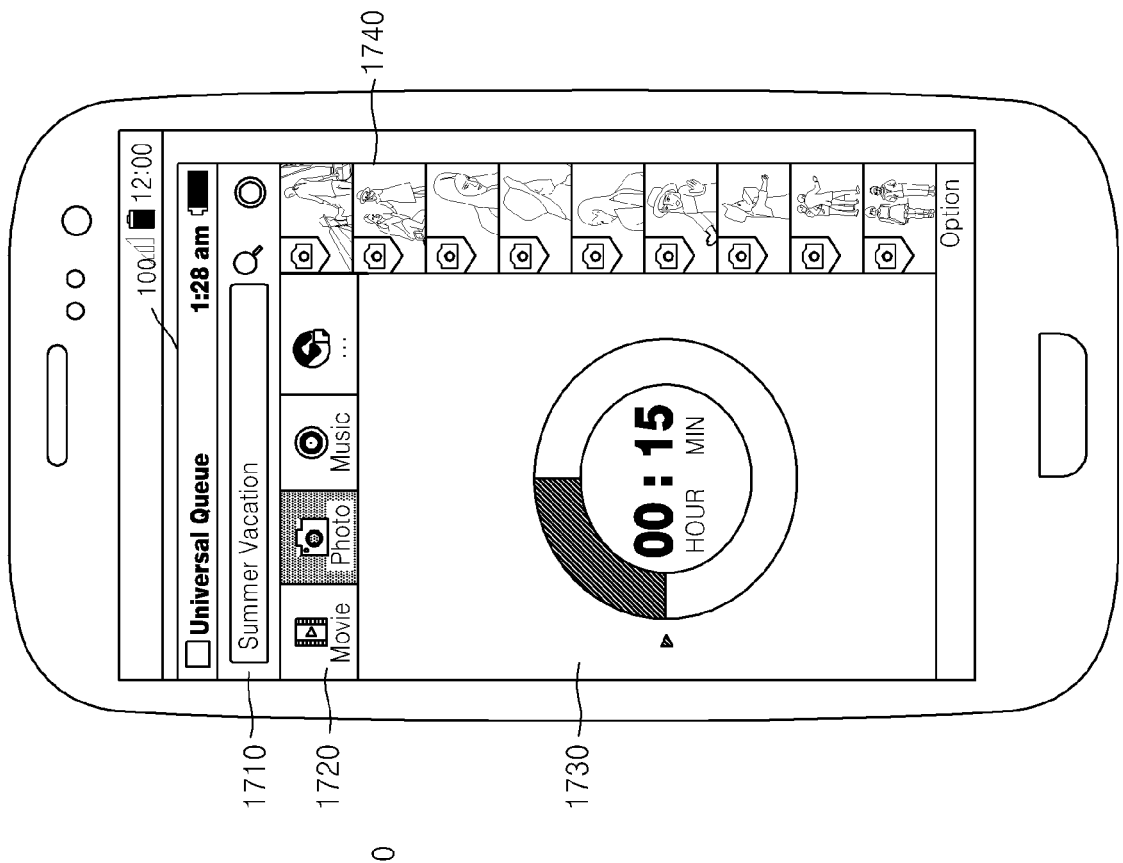
FIGS. 17A and 17B illustrate recommendation item lists corresponding to recommendation conditions according to an exemplary embodiment.
Figure 17A:
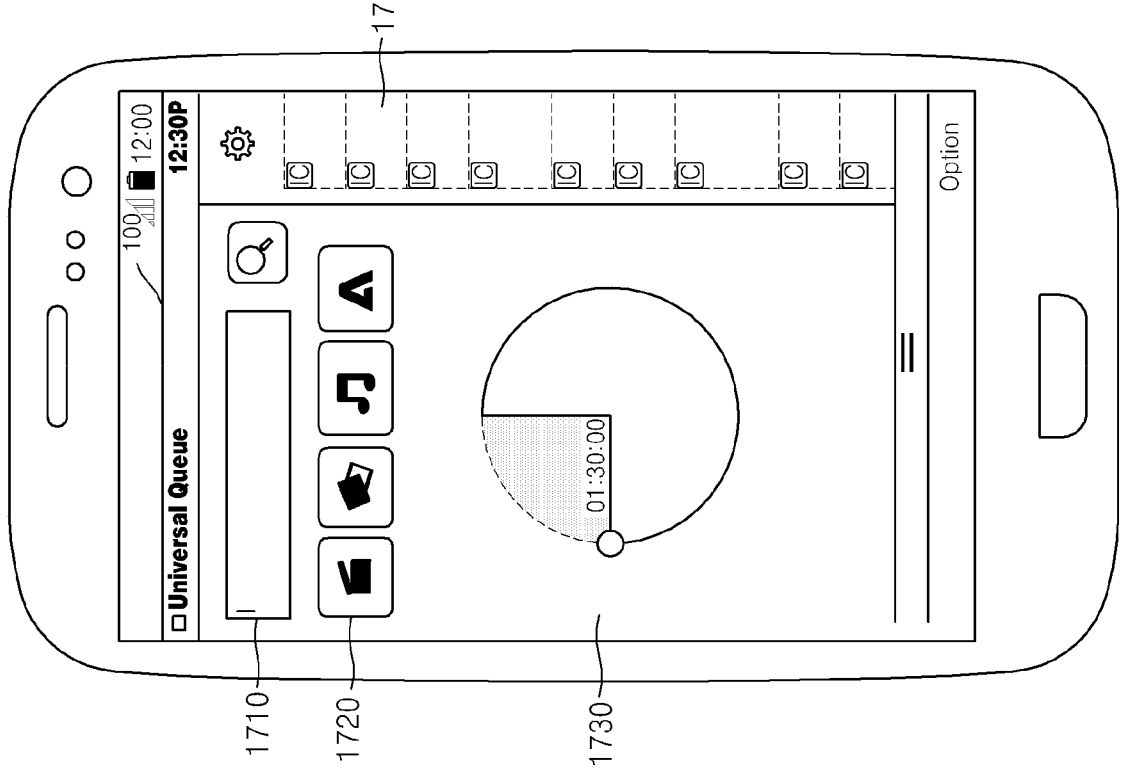

FIGS. 17A and 17B illustrate recommendation item lists corresponding to recommendation conditions according to an exemplary embodiment.

Referring to FIG. 17A, the device 100 may provide an input window used to input the recommendation condition. The input window may include a search field 1710 used to input a search keyword, a type field 1720 used to select an item type, a time field 1730 used to select a reproduction time length, etc. When a user inputs the recommendation condition, the device 100 may display the recommendation item list corresponding to the input recommendation condition on a certain region.

Referring to FIG. 17B, when a "summer vacation" is input into the search field 1710, a "photo" is selected in the type field 1720, and "15 minutes" is input in the time field 1730, the device 100 may display a photo item list numbering as many as the number of summer vacation photos that may be viewed within 15 minutes on the recommendation panel 1740.

According to an exemplary embodiment, the device 100 may request and receive photos numbering as many as the number of summer vacation photos that may be viewed within 15 minutes from the server 200 as recommendation items. The device 100 may extract photos relating to the summer vacation from among the recommendation items received from the server 200 that number as many as the number of photos that the user may view within 15 minutes.

Figure 18:
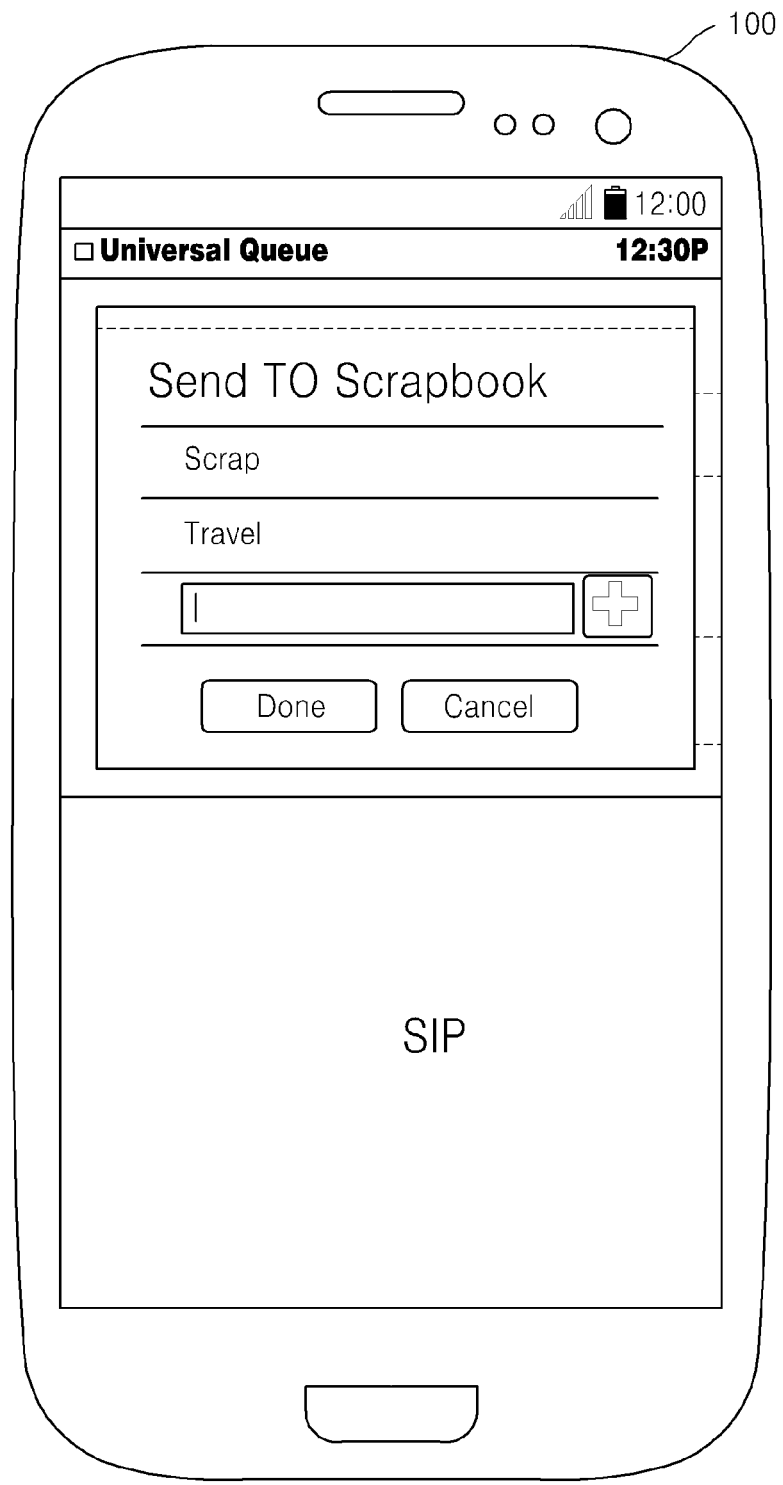
FIG. 18 is a diagram for explaining a method of transmitting recommendation items to an external device according to an exemplary embodiment.

FIG. 18 is a diagram for explaining a method of transmitting recommendation items to an external device according to an exemplary embodiment.

Referring to FIG. 18, the device 100 may transmit the recommendation items displayed on a recommendation panel to the external device. The external device according to an exemplary embodiment may include a cloud server, a web server, an SNS server, a device owned by another user, etc. For example, the device 100 may upload at least one recommendation item to the SNS server via an SNS account of a user.

Figure 19:
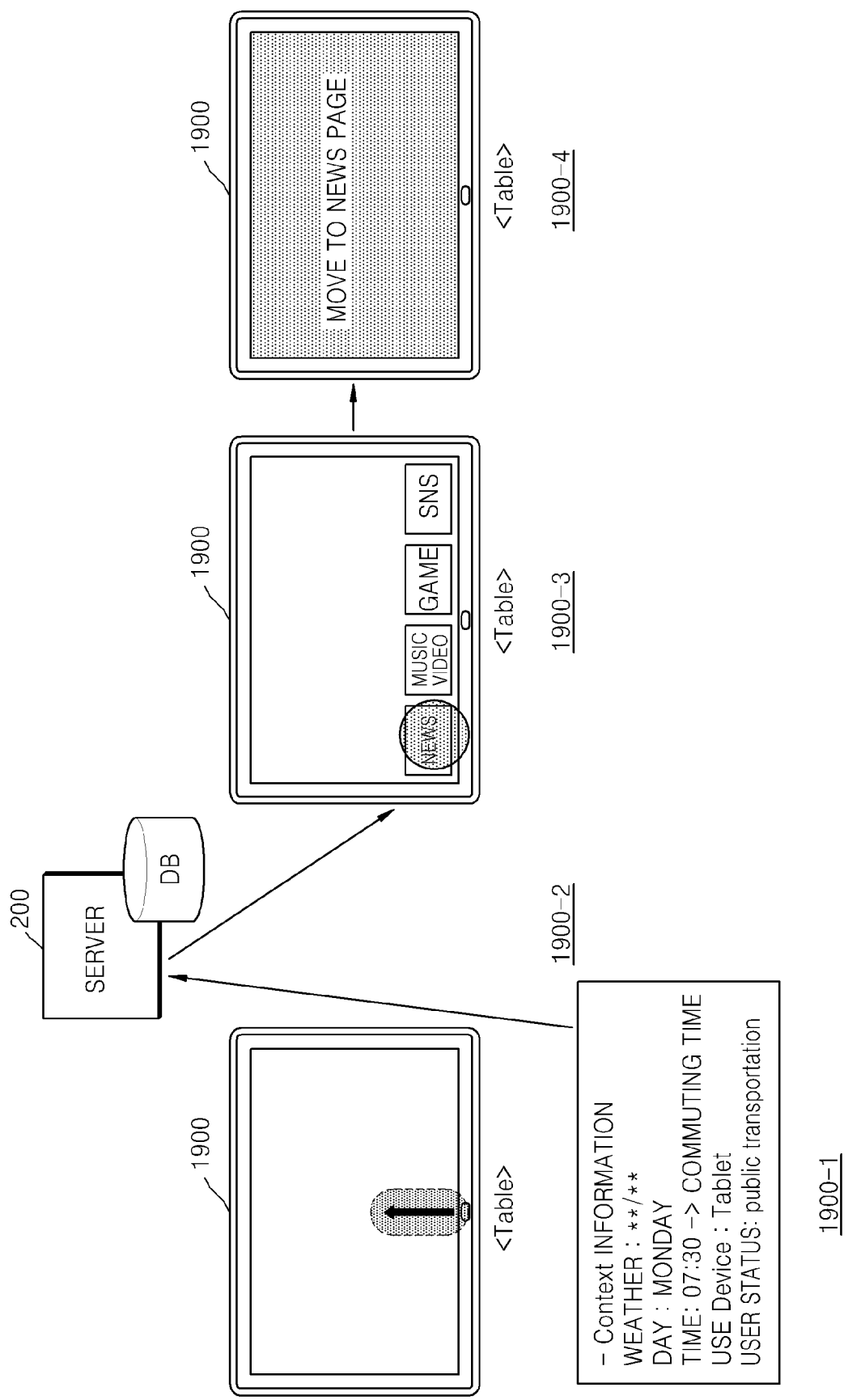
FIG. 19 illustrates screens that provide recommendation items selected based on context information according to an exemplary embodiment.

FIG. 19 illustrates screens that provide recommendation items selected based on context information according to an exemplary embodiment.

Referring to 1900-1, a device 1900 may detect a recommendation panel request gesture of a user. In this regard, the device 1900 may request the recommendation items while transmitting information (for example, indicating an ID of the device 1900 or that the device 1900 is a tablet PC) regarding a type of the device 1900 and the context information to the server 200.

For example, the device 1900 may transmit information such as date, day (for example, Monday), time (for example, 7:30 a.m., commuting time), a use device (for example, a tablet PC), a user status (for example, using public transportation), etc. as the context information to the server 200 when the recommendation items are requested.

Referring to 1900-2, the server 200 may select recommendation items from among items previously used in a plurality of devices owned by the user in consideration of the context information received from the device 1900. For example, the server 200 may select an item that the user frequently uses in the tablet PC at a public transportation facility during the commuting time on the weekday morning as the recommendation items (for example, a news providing application, a music video, a mini game, and an SNS application).

According to another exemplary embodiment, the server 200 may calculate a time when the user uses the public transportation facility during the commuting time on the weekday morning and may select an item suitable for consumption while using the public transportation facility as the recommendation item.

Referring to 1900-3, the device 1900 may receive the recommendation items (for example, the news providing application, the music video, the mini game, and the SNS application) from the server 200 and may display a list of the received recommendation items (for example, the news providing application, the music video, the mini game, and the SNS application) on a recommendation panel.

Referring to 1900-4, when the user selects the "news providing application" from among the recommendation items displayed on the recommendation panel, the device 1900 may execute the news providing application and display a new page on a screen.

Figure 20:
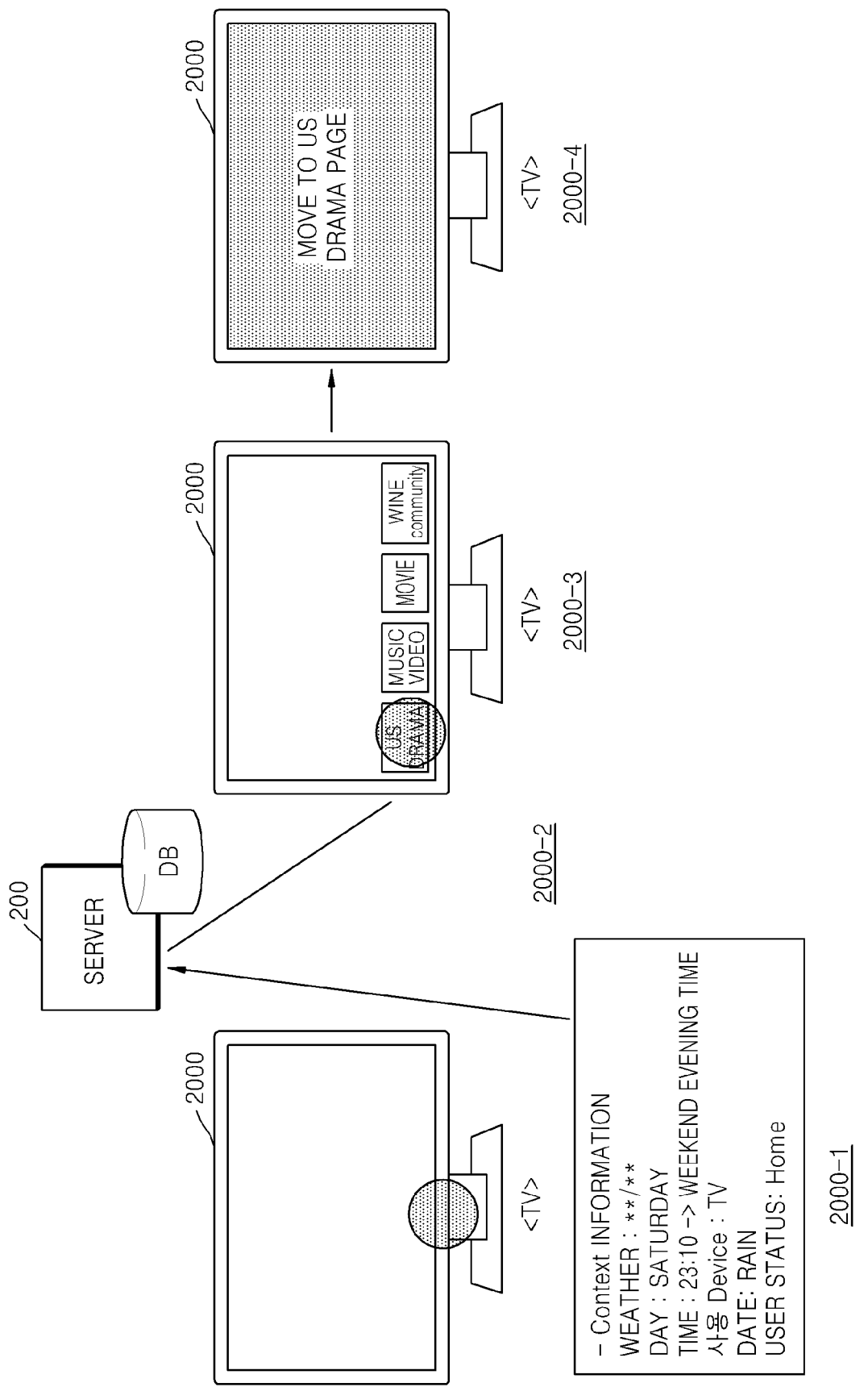
FIG. 20 illustrates screens that provide recommendation items selected based on context information according to another exemplary embodiment.

FIG. 20 illustrates screens that provide recommendation items selected based on context information according to another exemplary embodiment.

Referring to 2000-1, a device 2000 may detect a recommendation panel request gesture of a user. In this regard, the device 2000 may request the recommendation items while transmitting information regarding a type of the device 2000 and the context information to the server 200.

For example, the device 2000 may transmit information such as date, day (for example, Saturday), time (for example, 23:10 p.m., on a weekend evening), a use device (for example, a TV), weather (for example, rainy), a user status (for example, at home), etc. as the context information to the server 200 when the recommendation items are requested.

Referring to 2000-2, the server 200 may select recommendation items from among items previously used in a plurality of devices owned by the user in consideration of the context information received from the device 2000. For example, the server 200 may select items that the user frequently uses via the TV on weekend evenings as the recommendation items (for example, a US drama, a music video, movie, a wine community, etc.) The server 200 may select an item that the user uses via the TV while taking a rest on weekend evenings as the recommendation item.

Referring to 2000-3, the device 2000 may receive the recommendation items (for example, the US drama, the music video, movie, the wine community, etc.) from the server 200 and may display a list of the received recommendation items (for example, the US drama, the music video, movie, the wine community, etc.) on a recommendation panel.

Referring to 2000-4, when the user selects "US drama content" from among the recommendation items displayed on the recommendation panel, the device 2000 may display a US drama page on a screen.

Figure 21A:
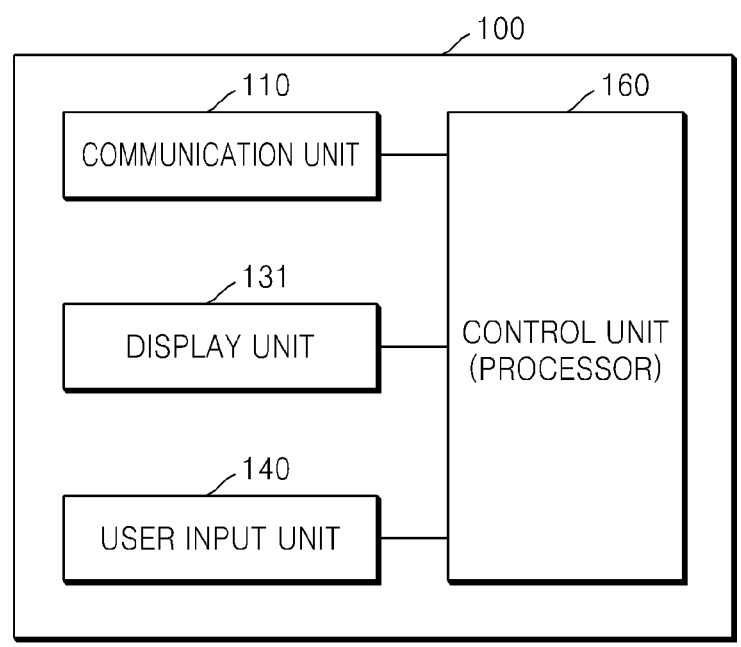
FIGS. 21A and 21B are block diagrams of a device according to various exemplary embodiments.
Figure 21B:
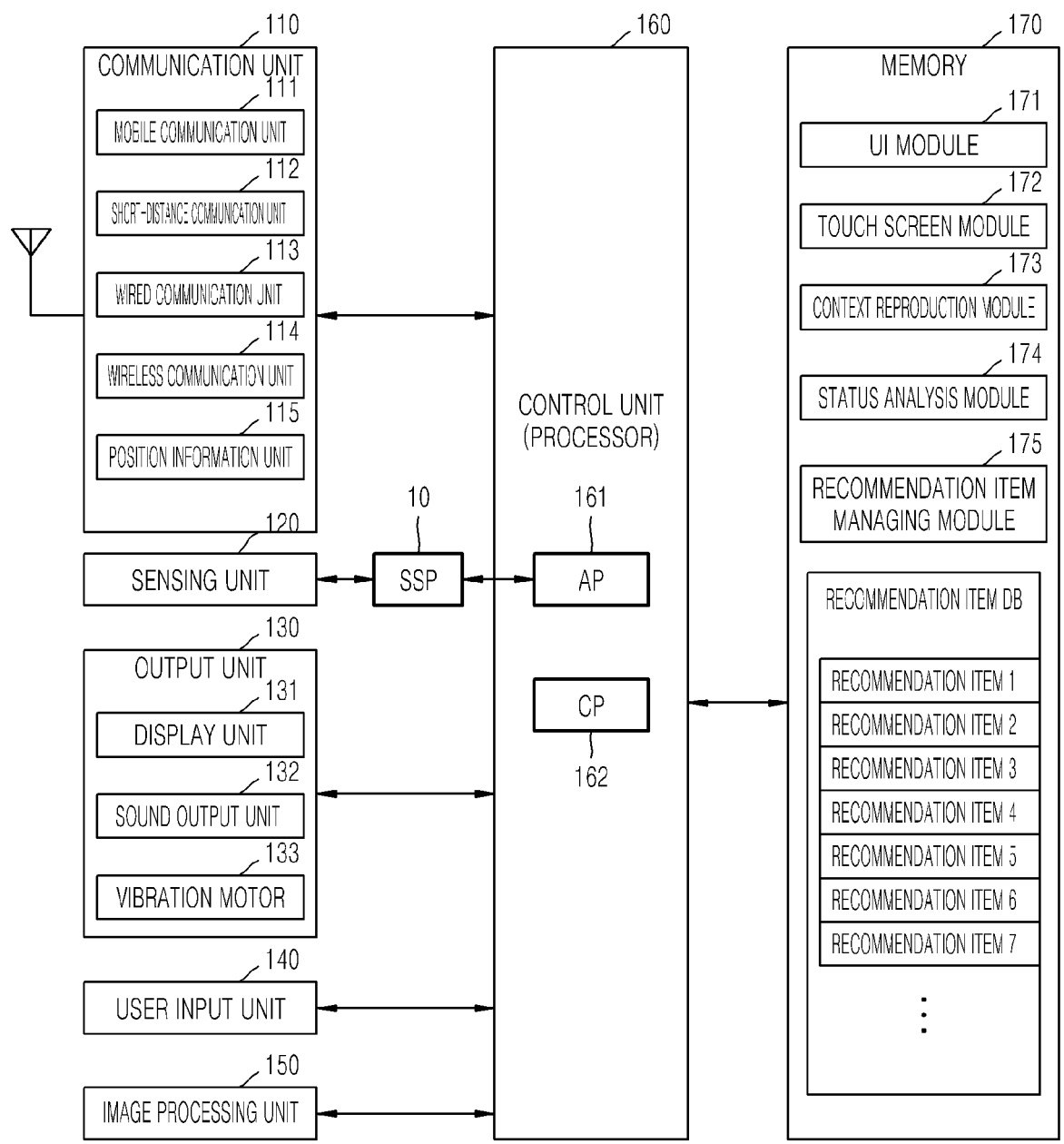

FIGS. 21A and 21B are block diagrams of the device 100 according to various exemplary embodiments.

Referring to FIG. 21A, the device 100 may include a communication unit 110 (e.g., a communicator, etc.), a display unit 131 (e.g., a display, etc.), a user input unit 140 (e.g., a user input, etc.), and a control unit 160 (e.g., a controller, processor, etc.). However, these elements are not all essential. The device 100 may be implemented with more or less elements than the elements of FIG. 21A.

For example, referring to FIG. 21B, the device 100 according to an exemplary embodiment may include the communication unit 110, a sensing unit 120 (e.g., a sensor, etc.), an output unit 130 (e.g., an output, etc.), an image processing unit 150 (e.g., an image processor, etc.), the control unit 160, and a memory 170.

The above elements will now be described below.

The communication unit 110 may include one or more elements for allowing communication between the device 100 and the server 200. For example, the communication unit 110 may include a mobile communication unit 111, a short-distance communication unit 112, a wired communication unit 113, a wireless communication unit 114, and a position information unit 115 which provides information on the location of the device.

A short-distance communication technology according to an exemplary embodiment may include a wireless LAN (Wi-Fi), Bluetooth, ZigBee, Wi-Fi Direct (WFD), ultra wideband (UWB), infrared data association (IrDA), and Bluetooth low energy (BLE), but is not limited thereto.

The sensing unit 120 may collect events that occur in the device 100. For example, the sensing unit 120 may sense a position of the device 100, user state information, application information regarding an application used in the device 100, exchanged message information, exchanged email information, call history information, SNS use information, web page use information, transaction information, etc.

The sensing unit 120 may include various sensors so as to collect event information. For example, the sensing unit 120 may include an acceleration sensor, a tilt sensor, a gyro sensor, a 3-axis magnetic sensor, a voice recognition sensor, a luminance sensor, a temperature sensor, an image sensor (e.g., a camera), a touch sensor, etc., but is not limited thereto.

The sensing unit 120 according to an exemplary embodiment may interoperate with an SSP 10. The SSP 10 may include a sensor hub and an SSP manager. In this regard, according to an exemplary embodiment, the sensing unit 120 may be connected to the sensor hub, and the SSP manager may be included in a framework of an AP 161.

Thus, the sensor hub may collect sensing information (the event information regarding the events occurring in the device 100) via the sensing unit 120. In this regard, in a case where the AP 161 in a sleep mode has to be active, the sensor hub may transmit an interrupt signal to the SSP manager so as to inform the SSP manager of data to be transmitted.

The SSP manager may transmit a signal for requesting the sensor hub for a type and length of the data to be transmitted by the sensor hub. In this case, the sensor hub may transmit to the SSP manger content including the type and length of the data to be transmitted. The SSP manager may transmit a start-to-read message to the sensor hub, and when the sensor hub receives the start-to-read message, the sensor hub may process sensing data to a predefined packet and then may transmit the packet to the SSP manager.

The output unit 130 may function to output an audio signal, a video signal, or a vibration signal and may include a display unit 131, a sound output unit 132, a vibration motor 133, etc.

The display unit 131 displays and outputs information that is processed in the device 100. For example, the display unit 131 may display a recommendation panel including recommendation items on a screen (e.g., a first screen).

When the display unit 131 and a touch pad form a layer structure and then are formed as a touch screen, the display unit 131 may be used as both an output device and input device. The display unit 131 may include at least one of a liquid crystal display (LCD), a thin film transistor-liquid crystal display (TFT-LCD), an organic light-emitting diode (OLED) display, a flexible display, a 3D display, and an electrophoretic display. Also, according to a type of the device 100, the device 100 may include two or more display units 131. In this regard, the two or more display units 131 may face each other by using a hinge.

The sound output unit 132 may output audio data that is received from the communication unit 110 or is stored in the memory 170. The sound output unit 132 may also output a sound signal (e.g., a call signal receiving sound, a message receiving sound, etc.) related to functions performed by the device 100. The sound output unit 132 may include a speaker, a buzzer, etc.

The vibration motor 133 may output a vibration signal. For example, the vibration motor 133 may output the vibration signal that corresponds to an output of the audio data (e.g., the call signal receiving sound, the message receiving sound, etc.) or video data. Also, when a touch is input to the touch screen, the vibration motor 133 may output a vibration signal.

The user input unit 140 may be a unit by which the user inputs data so as to control the device 100. For example, the user input unit 140 may include a key pad, a dome switch, a touch pad (a touch capacitive type touch pad, a pressure resistive type touch pad, an infrared beam sensing type touch pad, a surface acoustic wave type touch pad, an integral strain gauge type touch pad, a Piezo effect type touch pad, or the like), a jog wheel, and a jog switch, but is not limited thereto.

The image processing unit 150 may generate thumbnail images or preview images of recommendation items displayed on the recommendation panel. For example, when web page content includes images and text, the image processing unit 150 may capture only images and generate thumbnail images or preview images corresponding to the web page content.

When a user collection request gesture with respect to image content displayed on an entire screen is detected, the image processing unit 150 may reduce images displayed on the entire screen and generate thumbnail images or preview images corresponding to the image content.

When a user collection request gesture with respect to text content displayed on the entire screen is detected, the image processing unit 150 may extract title information of the text content displayed on the entire screen and generate thumbnail images or preview images corresponding to the text content. If the title information of the text content is not extracted from the text content, the image processing unit 150 may generate the thumbnail images or the preview images corresponding to the text content by using a first line of the text content.

The control unit 160 may generally control all operations of the device 100. That is, the control unit 160 may execute programs stored in the memory 170 and accordingly may control the communication unit 110, the sensing unit 120, the output unit 130, the user input unit 140, the image processing unit 150, the memory 170, etc.

The control unit 160 may include the AP 161 and a communication processor 162. The AP 161 may control execution of various applications stored in the memory 170. The communication processor 162 may control various communication functions. According to an exemplary embodiment, the AP 161 and the communication processor 162 may be integrally implemented as one hardware device or separately implemented as independent hardware devices.

The memory 170 may store a program to process and to control the control unit 160, or may store a plurality of pieces of data (e.g., recommendation items, information regarding content, sensing information, etc.) that are input/output.

The memory 170 may include at least one storage medium from among a flash memory-type storage medium, a hard disk-type storage medium, a multimedia card micro-type storage medium, card-type memories (e.g., an SD card, an XD memory, etc.), Random Access Memory (RAM), Static Random Access Memory (SRAM), Read-Only Memory (ROM), Electrically Erasable Programmable Read-Only Memory (EEPROM), Programmable Read-Only Memory (PROM) magnetic memory, a magnetic disc, and an optical disc. The device 100 may operate web storage or a cloud server that performs a storing function of the memory 170 via the Internet.

The programs stored in the memory 170 may be classified into a plurality of modules according to their functions, for example, into a UI module 171, a touch screen module 172, a content reproduction module 173, a context analysis module 174, a recommendation item managing module 174, etc.

The UI module 171 may provide a UI or GUI which are specialized according to applications. The touch screen module 172 may detect a user touch gesture on the touch screen and may transmit information regarding the touch gesture to the control unit 160. The touch screen module 172 may be configured as a separate controller (hardware)

Various sensors may be arranged in or near the touch screen so as to detect a touch or a proximate touch on the touch sensor. An example of the sensor to detect the touch on the touch screen may be a tactile sensor. The tactile sensor detects a contact of a specific object at least as sensitively as a person can detect. The tactile sensor may detect various types of information such as the roughness of a contact surface, the hardness of the contact object, the temperature of a contact point, or the like.

The touch gesture of the user may include a tap gesture, a touch & hold gesture, a double tap gesture, a drag gesture, a panning gesture, a flick gesture, a drag & drop gesture, or the like.

"Tapping" is a user's motion of touching a screen by using a finger or a touch tool such as an electronic pen and then instantly lifting the finger or touch tool from the screen without moving the finger or touch tool.

"Touching & holding" is a user's motion of touching a screen by using a finger or a touch tool such as an electronic pen and then maintaining the above touching motion over a critical time (e.g., 2 seconds), after touching the screen. For example, a time difference between a touch-in time and a touch-out time is greater than or equal to the critical time, for example, 2 seconds. When a touch input lasts more than the critical time, a feedback signal may be provided in a visual, acoustic, or tactile manner in order to inform the user whether the touch input is tapping or touching & holding. The critical time may vary according to embodiments.

"Double tapping" is a user's motion of touching the screen twice by using the finger or touch tool (such as a stylus pen).

"Dragging" is a user's motion of touching the screen by using the finger or touch tool and moving the finger or touch tool to another position on the screen while keeping the touching motion. The dragging motion may enable the moving or panning motion of an object.

"Panning" is a user's motion of performing a dragging motion without selecting an object. Since no object is selected in the panning motion, no object is moved in a page but the page itself is moved on the screen or a group of objects may be moved within a page.

"Flicking" is a user's motion of performing a dragging motion over a critical speed, for example, 100 pixel/s, by using the finger or touch tool. The dragging (panning) motion or the flicking motion may be distinguished based on whether the moving speed of the finger or touch tool is over the critical speed, for example, 100 pixel/s, or not.

"Dragging & Dropping" is a user's motion of dragging an object to a predetermined position on the screen by using the finger or touch tool and then dropping the object at that position.

"Pinching" is a user's motion of moving two fingers touching the screen in opposite directions. The pinching motion is a gesture to magnify (open pinch) or contract (close pinch) an object or a page. A magnification value or a contraction value is determined according to the distance between the two fingers.

"Swiping" is a user's motion of touching an object on the screen by using the finger or touch tool and simultaneously moving the object horizontally or vertically by a predetermined distance. A swiping motion in a diagonal direction may not be recognized as a swiping event.

The memory 170 may include a voice recognition module (not shown) that recognizes a voice of the user by using a voice recognition engine and transmits the recognized voice to the control unit 160.

The content reproduction module 173 may reproduce predetermined content.

The context analysis module 174 may analyze a context, based on the event information collected by the sensing unit 120. For example, the context analysis module 174 may analyze environmental information of the device 100, user state information, state information of the device, etc.

The recommendation item managing module 175 may manage recommendation items received from the server 200.

Figure 22:
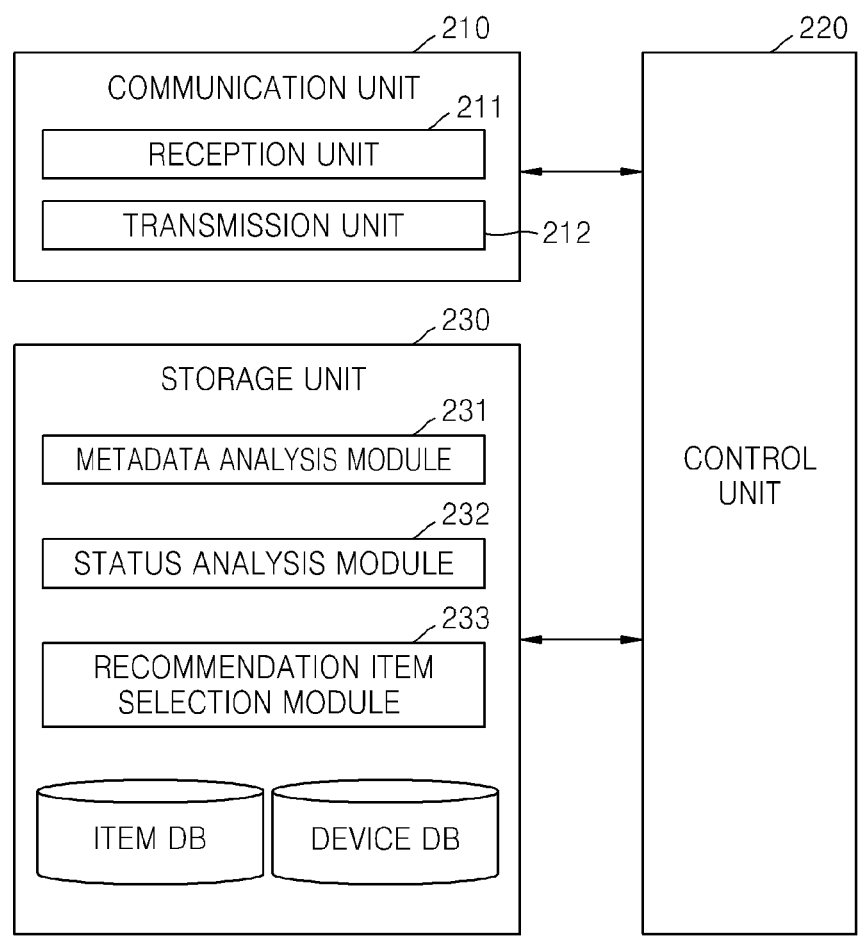
FIG. 22 is a block diagram of a server according to an exemplary embodiment.

FIG. 22 is a block diagram of the server 200 according to an exemplary embodiment.

Referring to FIG. 22, the server 200 according to an exemplary embodiment may include a communication unit 210 (e.g., a communicator, etc.), a control unit 220 (e.g., a controller, etc.), and a storage unit 230 (e.g., a storage, etc.). However, these elements are not all essential. The server 200 may be implemented with more or less elements than the elements of FIG. 22.

The above elements will now be described below.

The communication unit 210 may include one or more elements for allowing communication between the server 200 and the device 100. The communication unit 210 may include a reception unit 211 (e.g., a receiver, etc.) and a transmission unit 212 (e.g., a transmitter, etc.).

The reception unit 211 may receive information regarding a type of the device 100 and a request for recommendation items that are to be displayed on a recommendation panel of the device 100 from the device 100. For example, the reception unit 211 may receive context information including at least one of position information of the device 100, use state information, information regarding an environment within a predetermined radius from the device 100, time information, and user schedule information from the device 100.

The reception unit 211 may receive recommendation condition information input by a user from the device 100.

The recommendation condition information according to an exemplary embodiment may include user's feelings, a position of the user, weather, a recommendation item use purpose, a reproduction time length, types of items, etc., but is not limited thereto.

The reception unit 211 may receive information regarding items used in a plurality of devices of the user from each of the plurality of devices of the user. In this regard, the reception unit 211 may receive information regarding at least one item (for example, content, applications, service, etc.) registered in an OS scheduler from each of the plurality of devices at a predetermined interval. When use state changes of the plurality of devices of the user or use state changes of the items are detected, the reception unit 211 may receive information regarding the at least one item registered in the OS scheduler of the plurality of devices of the user.

For example, information regarding items may include at least one of item names, item types (for example, a moving image, a still image, a web page, etc.) an item collection time, application information related to items, item components, environment information (for example, weather, temperature, moisture, etc.) in relation to when items are collected, item collection paths, information regarding a device that collects items (for example, device type information, device identification information, etc.), use state information in relation to when items are collected, etc., but is not limited thereto.

The transmission unit 212 may transmit at least one recommendation item to the device 100. The transmission unit 212 may request information regarding at least one item that is being used in the plurality of devices of the user from each of the plurality of devices of the user at a predetermined interval.

The control unit 220 may generally control all operations of the server 200. The control unit 220 according to an exemplary embodiment may execute at least one program stored in the storage unit 230 and accordingly may select recommendation items that are to be displayed on the recommendation panel of the device 100. The control unit 220 may also execute the at least one program stored in the storage unit 230 and accordingly may analyze information regarding items received from the device 100.

The storage unit 230 may store a program to process and to control the control unit 220, or may store a plurality of pieces of data (e.g., items collected from devices, information regarding items, information regarding recommendation items, etc.) that are input/output.

The programs stored in the storage unit 230 may be classified into a plurality of modules according to their functions, for example, into a metadata analysis module 231, a context analysis module 232, a recommendation item selection module 233, etc.

The metadata analysis module 231 may analyze information regarding items received in the form of metadata from the plurality of devices of the user. In this regard, the information regarding the items may include basic attribute information and context information. The basic attribute information which is information regarding item attributes may include item names, item types, item genre, item reproduction lengths, item thumbnail images, item link information, etc., but is not limited thereto.

The context information which is information regarding a status when the device 100 collects items may include weather, temperature, a position, a user status, user's feelings, collection paths, identification information of the device 100 that collects items, information regarding a type of the device 100, etc., but is not limited thereto.

The metadata analysis module 231 may analyze the information (or an item DB) regarding items collected from the plurality of devices of the user and may obtain item use pattern information of each device, item use pattern information of each position, item use pattern information of each user status (or feelings), item use pattern information of each weather, etc.

The context analysis module 232 may analyze a context, based on event information received from the device 100. According to an exemplary embodiment, the context analysis module 232 may analyze the event information collected by the device 100 based on ontology. For example, the context analysis module 232 may analyze context (for example, a use state, user's feelings, weather, a season, a place, a schedule, etc.) of the device 100 at the time when recommendation items are requested.

The recommendation item selection module 233 may select at least one recommendation item from among items previously used in the plurality of devices of the user based on the type of the device 100. For example, the recommendation item selection module 233 may select at least one recommendation item based on the item use pattern information of the device 100. The recommendation item selection module 233 may select at least one recommendation item based on at least one of hardware information and software information of the device 100.

The recommendation item selection module 233 according to an exemplary embodiment may select at least one recommendation item in further consideration of time information when the device 100 requests recommendation items, position information of the device 100, user state information, and recommendation condition information.

According to an exemplary embodiment, recommendation items according to a type of a device may be provided by analyzing item use pattern information of a user for each device.

The device 100 and the server 200 according to an exemplary embodiment may recommend at least one item to the user from among previously used items by analyzing information regarding various items that were used in a plurality of devices of the user.

According to an exemplary embodiment, when a user input that requests a recommendation panel is received, the device 100 may provide the recommendation panel according to the user input while transmitting recommendation item request information including at least one of information regarding the device 100 and context information to the server 200.

One or more exemplary embodiments may also be embodied as programmed commands to be executed in various computer means, and then may be recorded to a computer-readable recording medium. The computer-readable recording medium may include one or more of the programmed commands, data files, data structures, or the like. The programmed commands recorded to the computer-readable recording medium may be particularly designed or configured for one or more exemplary embodiments. Examples of the computer-readable recording medium include magnetic media including hard disks, magnetic tapes, and floppy disks, optical media including CD-ROMs and DVDs, magneto-optical media including floptical disks, and a hardware apparatus designed to store and execute the programmed commands in ROM, RAM, a flash memory, and the like. Examples of the programmed commands include not only machine codes generated by a compiler but also include great codes to be executed in a computer by using an interpreter. The hardware apparatus may be configured to function as one or more software modules so as to perform operations of one or more exemplary embodiments.

It should be understood that the exemplary embodiments described herein should be considered in a descriptive sense only and not for purposes of limitation. Descriptions of features or aspects within each embodiment should typically be considered as available for other similar features or aspects in other embodiments.

While one or more exemplary embodiments have been described with reference to the figures, it will be understood by those of ordinary skill in the art that various changes in form and details may be made therein without departing from the spirit and scope of the inventive concept as defined by the following claims.

What is claimed is:

1. A device comprising:
a touch display configured to receive a touch input;
a communicator configured to communicate with a server; and
a controller configured to:
receive, from a user of the device, a first touch input comprising a collection request gesture corresponding to an item;
based on the collection request gesture, capture item information about the item, including a thumbnail image associated with the item and collection context information relating to a context of the device when the first touch input was received,
control the communicator to transmit to the server user information associated with a user account of the user of the device and the item information;
receive, from the user of the device, a second touch input;
in response to receiving a second touch input, control the communicator to transmit a request for receiving a recommendation item to the server, the request including device information which includes request context information relating to a context of the device when the second touch input was received,
control the communicator to receive from the server at least one recommendation item based on the user information, the device information, and the item information, wherein the at least one recommendation item includes the item based on a result of a comparison between the collection context information and the request context information; and
control the touch display to provide a user interface comprising a panel including the at least one recommendation item received from the server in response to the second touch input.

2. The device of claim 1, wherein the panel is displayed based on the second touch input.

3. The device of claim 1, wherein the device information comprises at least one from among device type information, device identification information, device address information, and account information.

4. The device of claim 1, wherein the at least one recommendation item is selected based on at least one from among item use pattern information of the device, hardware information of the device, and software information of the device.

5. The device of claim 1, wherein the request context information comprises at least one from among location information of the device, status information of the user, environment information within a predetermined distance from the device, and schedule information of the user.

6. The device of claim 1, wherein the controller controls the touch display to display a setting window used to input a recommendation condition and controls the touch display to receive the recommendation condition from the user through the setting window,
  wherein the communicator transmits a recommendation item request comprising information regarding the recommendation condition to the server in response to the second touch input, and
  wherein the at least one recommendation item is selected in further consideration of the recommendation condition.

7. The device of claim 6, wherein the recommendation condition comprises at least one from among item types, item reproduction time, item use purpose, item collection time, and feelings status information of the user.

8. The device of claim 1, wherein the controller aligns the at least one recommendation item on the panel based on at least one from among collection time information and use frequency information.

9. The device of claim 1, wherein the controller adjusts a size of the at least one recommendation item displayed on the panel according to a capacity of the at least one recommendation item.

10. The device of claim 1, wherein the controller collects the item information and transmits the item information to the server through the communicator.

11. The device of claim 10, wherein the controller detects a use status change of the device and collects the item information registered in an operating system (OS) scheduler.

12. The device of claim 10, wherein the item information comprises at least one from among a name of the item, a type of the item, a collection time of the item, an application relating to the item, a configuration component of the item, environment information in relation to when the item is collected, a collection path of the item, device information in which the item is collected, and user status information in relation to when the item is collected.

13. The device of claim 1, wherein the collection request gesture comprises a shrink gesture that moves at least three fingers that touch a screen of the device in a direction that the at least three fingers become closer to each other.

14. The device of claim 1, further comprising: an image processor which is configured to generate the thumbnail image in response to the collection request gesture.

15. A recommendation panel providing method performed by a device, the method comprising:
  receiving, from a user of the device, a first touch input comprising a collection request gesture corresponding to an item;
  based on the collection request gesture, capturing item information about the item, including a thumbnail image associated with the item and collection context information relating to a context of the device when the first touch input was received;
  transmitting to a server user information associated with a user account of the user of the device and the item information;
  receiving, from the user of the device, a second touch input;
  transmitting a request for receiving a recommendation item to the server in response to the second touch input, the request including device information which includes request context information relating to a context of the device when the second touch input was received;
  receiving from the server at least one recommendation item based on the user information, the device information, and the item information, wherein the at least one recommendation item includes the item based on a result of a comparison between the collection context information and the request context information and
  providing a user interface comprising a panel including the at least one recommendation item received from the server in response to the second touch input.

16. The method of claim 15, wherein the panel is displayed based on the second touch input, and
  wherein the transmitting, the receiving, and the displaying are performed by using a resident program installed in the device.

17. The method of claim 15, wherein the at least one recommendation item is selected from the server in further consideration of information regarding a time at which the device requests the at least one recommendation item.

18. The method of claim 15, wherein the request for receiving the recommendation item comprises at least one from among location information of the device and status information of the user, and
  wherein the at least one recommendation item is selected from the server in further consideration of at least one from among the location information of the device and the status information of the user.

19. The method of claim 15, wherein the displaying of the panel comprises: aligning the at least one recommendation item on the panel based on at least one from among collection time information and use frequency information stored on the device.

20. The method of claim 15, further comprising:
  receiving a selection of one of the at least one recommendation item included in the panel; and
  reproducing the selected recommendation item.

21. A non-transitory computer-readable storage medium storing a computer program for executing a recommendation panel providing method performed by a device, the method comprising:
  receiving, from a user of the device, a first touch input comprising a collection request gesture corresponding to an item;
  based on the collection request gesture, capturing item information about the item, including a thumbnail image associated with the item and collection context information relating to a context of the device when the first touch input was received;
  transmitting to a server user information associated with a user account of the user of the device and the item information;
  receiving a second touch input from the user of the device;
  transmitting a request for receiving a recommendation item to the server in response to a second touch input, the request including device information which includes request context information relating to a context of the device when the second touch input was received;
  receiving from the server at least one recommendation item based on the user information, the device information, and the item information wherein the at least one recommendation item includes the item based on a result of a comparison between the collection context information and the request context information; and
  providing a user interface comprising a panel including the at least one recommendation item received from the server in response to the second touch input.

22. A server comprising:
a storage which is configured to store item information received from a device about an item;
a receiver which is configured to receive, from the device, a first touch input information collected based on a first touch input of a user at the device comprising a collection request gesture corresponding to the item, the item information including a thumbnail image associated with the item and collection context information relating to a context of the device when the first touch input was received;
the receiver which is configured to receive, from the device, a second touch input information collected based on a second touch input of a user at the device;
the receiver which is configured to receive, from the device, user information associated with a user account of the user of the device and a request for receiving a recommendation item, the request including device information which includes request context information relating to a context of the device when the second touch input was received;
a controller which is configured to select at least one recommendation item based on the user information, the device information, and the item information, wherein the at least one recommendation item includes the item based on a result of a comparison between the collection context information and the request context information;
a transmitter which is configured to transmit the selected at least one recommendation item to the device and wherein the at least one recommendation item is configured to be included in a panel of a user interface of the device.

23. The server of claim 22, wherein the controller selects the at least one recommendation item based on at least one from among item use pattern information of the device, hardware information of the device, and software information of the device.

24. The server of claim 22, wherein the controller selects the at least one recommendation item in further consideration of information regarding a time at which the request for receiving the recommendation item is received.

25. The server of claim 22,
wherein the request context information comprises at least one from among location information of the device, status information of the device, environment information within a predetermined distance from the device, and schedule information of the device.

26. The server of claim 22, wherein the request for receiving the recommendation item comprises recommendation condition information input by the user from the device, and
wherein the controller selects the at least one recommendation item in further consideration of the recommendation condition information.

27. The server of claim 22, wherein the receiver receives information regarding items used in plurality of devices of the user from the plurality of devices of the user, and
wherein the controller determines item use pattern information corresponding to each of the plurality of devices of the user by using the information regarding the items used in the plurality of devices of the user.

28. The server of claim 22, wherein the transmitter transmits a request to each of a plurality of devices for information regarding at least one item used in the plurality of devices of the user at a predetermined period.

29. A recommendation item providing method performed by a server, the method comprising:
storing item information received from a device about an item;
receiving, from the device, a first touch input information collected based on a first touch input of a user at the device comprising a collection request gesture corresponding to the item, the item information including a thumbnail image associated with the item and collection context information relating to a context of the device when the first touch input was received;
receiving, from the device, a second touch input information collected based on a second touch input of a user at the device;
receiving, from the device, user information associated with a user account of the user of the device and a request for receiving a recommendation item, the request including device information which includes request context information relating to a context of the device when a second touch input was received;
selecting at least one recommendation item based on the user information, the device information, and the item information, wherein the at least one recommendation item includes the item based on a result of a comparison between the collection context information and the request context information; and
transmitting the selected at least one recommendation item to the device based on the second touch input,
wherein the recommendation item is configured to be included in a panel of a user interface of the device.

30. The method of claim 29, wherein the selecting comprises selecting the at least one recommendation item based on at least one from among item use pattern information of the device, hardware information of the device, and software information of the device.

31. The method of claim 29, wherein the selecting comprises selecting the at least one recommendation item in further consideration of information regarding a time at which the request for receiving the recommendation item is received.

32. The method of claim 29, wherein the request context information comprises at least one from among location information of the device, status information of the device, environment information within a predetermined distance from the device, and schedule information of the device.

33. The method of claim 29, wherein the storing comprises:
obtaining item use pattern information corresponding to each of a plurality of devices of the user by using items uploaded from the plurality of devices of the user; and
storing the obtained item use pattern information.

34. A method for providing a recommendation on a device, the method comprising:
receiving, from a user of the device, a first touch input comprising a collection request gesture corresponding to an item;
based on the collection request gesture, capturing item information about the item, including a thumbnail image associated with the item and collection context information relating to a context of the device when the first touch input was received;
transmitting to a server user information associated with a user account of the user of the device and the item information;
receiving, from a user of the device, a second touch input;
transmitting a request for receiving a recommendation item to the server in response to the second touch input, the request including device information which includes request context information relating to a context of the device when the second touch input was received;

receiving at least one recommendation item selected based on the user information, the device information, and the item information, wherein the at least one recommendation item includes the item based on a result of a comparison between the collection context information and the request context information; and displaying the received at least one recommendation item in a user interface comprising a panel including the at least one recommendation item received from the server in response to the second touch input.

35. The method of claim 34, wherein a type of the device comprises at least one from among a tablet, a television, a mobile phone, a desktop computer, and a laptop.

36. The method of claim 34, wherein the request for receiving the recommendation item comprises at least one from among location information of the device and status information of a user of the device, and wherein the at least one recommendation item is selected from a server in further consideration of the at least one from among the location information of the device and the status information of the user.

37. The method of claim 34, wherein the at least one recommendation item is selected from a server in further consideration of information regarding a time at which the device transmits the request for receiving the recommendation item.

38. The device of claim 1, wherein the collection request gesture comprises at least one from among a shrink gesture, a drag gesture, a tap gesture, a flick gesture, a drag and drop gesture, and a swipe gesture.

39. The device of claim 1, wherein the collection request gesture is received by the device, and the thumbnail image is captured by the device based on receiving the collection request gesture.

* * * * *